US010275112B2

(12) United States Patent
Nagao

(10) Patent No.: US 10,275,112 B2
(45) Date of Patent: Apr. 30, 2019

(54) COMPUTER READABLE MEDIUM, RELAY DEVICE AND INFORMATION PROCESSING DEVICE

(71) Applicant: FUJITSU COMPONENT LIMITED, Tokyo (JP)

(72) Inventor: Naoyuki Nagao, Tokyo (JP)

(73) Assignee: FUJITSU COMPONENT LIMITED, Tokyo (JP)

(*) Notice: Subject to any disclaimer, the term of this patent is extended or adjusted under 35 U.S.C. 154(b) by 415 days.

(21) Appl. No.: 14/686,363

(22) Filed: Apr. 14, 2015

(65) Prior Publication Data

US 2015/0309694 A1 Oct. 29, 2015

(30) Foreign Application Priority Data

Apr. 28, 2014 (JP) .................... 2014-092730

(51) Int. Cl.
*G06F 3/048* (2013.01)
*G09G 5/42* (2006.01)
(Continued)

(52) U.S. Cl.
CPC .......... *G06F 3/04812* (2013.01); *G06F 3/038* (2013.01); *G06F 3/0481* (2013.01);
(Continued)

(58) Field of Classification Search
CPC ............... G06F 3/0619; G06F 13/4068; G06F 17/30516; G06F 3/065; G06F 11/14;
(Continued)

(56) References Cited

U.S. PATENT DOCUMENTS 5,107,443 A * 4/1992 Smith .................... G06Q 10/10
713/166
5,898,419 A   4/1999 Liu
(Continued)

FOREIGN PATENT DOCUMENTS

CN      1889026 A    1/2007
CN    101339473 A    1/2009
(Continued)

OTHER PUBLICATIONS

Extended European Search Report dated Sep. 17, 2015 in corresponding European Patent Application No. 15163309.6.
(Continued)

*Primary Examiner* — Linh K Pham
(74) *Attorney, Agent, or Firm* — Staas & Halsey LLP

(57) ABSTRACT

A non-transitory computer readable medium causing a computer to execute a process, the process includes: acquiring coordinate information indicating a boundary between an operable region and an inoperable region in the operation screen of a server; acquiring, from an operating system of the computer, an arrangement coordinate of a first window displaying the operation screen of the server including a first mouse cursor; detecting positions of the operable region and the inoperable region from the acquired coordinate information and the acquired arrangement coordinate; and interrupting notifying the first window of a coordinate of a second mouse cursor when the coordinate of the second mouse cursor acquired from the operating system of the computer is included in the inoperable region.

15 Claims, 19 Drawing Sheets

(51) Int. Cl.
| | |
|---|---|
| *G06F 3/0481* | (2013.01) |
| *G06F 3/0484* | (2013.01) |
| *H04L 29/08* | (2006.01) |
| *G06F 9/451* | (2018.01) |
| *G06F 3/038* | (2013.01) |
| *G06F 3/14* | (2006.01) |
| *G09G 5/08* | (2006.01) |

(52) U.S. Cl.
CPC ........ *G06F 3/04845* (2013.01); *G06F 3/1454* (2013.01); *G06F 9/452* (2018.02); *G09G 5/08* (2013.01); *H04L 67/10* (2013.01); *G09G 2370/24* (2013.01)

(58) Field of Classification Search
CPC ................. G06F 11/2069; G06F 15/16; G06F 17/30368; G06F 17/5009; G06F 3/038; G06F 3/03543; G09G 2370/24; G09G 5/08

See application file for complete search history.

(56) References Cited

U.S. PATENT DOCUMENTS

| | | | | |
|---|---|---|---|---|
| 6,489,981 | B1* | 12/2002 | Jones | G06F 3/038 715/858 |
| 6,580,416 | B1* | 6/2003 | Gardner | G06F 3/017 345/156 |
| 2001/0004254 | A1* | 6/2001 | Okahara | G06F 3/038 345/157 |
| 2006/0288306 | A1 | 12/2006 | Mahajan et al. | |
| 2009/0128491 | A1* | 5/2009 | Katayama | G06F 3/038 345/163 |
| 2009/0235207 | A1* | 9/2009 | Choi | G06F 3/0346 715/851 |
| 2011/0306415 | A1* | 12/2011 | Tanaka | A63F 13/10 463/31 |
| 2012/0124509 | A1* | 5/2012 | Matsuda | G06F 3/011 715/782 |
| 2014/0240233 | A1* | 8/2014 | Jeong | G06F 3/0487 345/163 |
| 2015/0293663 | A1* | 10/2015 | Kono | G06F 3/0481 715/783 |
| 2015/0309694 | A1* | 10/2015 | Nagao | G06F 3/04812 715/740 |

FOREIGN PATENT DOCUMENTS

| | | |
|---|---|---|
| CN | 101685354 A | 3/2010 |
| CN | 102591493 A | 7/2012 |
| EP | 2 031 489 A2 | 3/2009 |
| JP | 2009-146394 | 7/2009 |
| JP | 2010-231703 | 10/2010 |
| JP | 2014-50096 | 3/2014 |

OTHER PUBLICATIONS

Microsoft Windows, "About Mouse Input", Oct. 1, 2011, Retrieved from the Internet on Sep. 4, 2015: <https://web.archive.org/web/20111001021132/http://msdn.microsoft.com/en-us/library/windows/desktop/ms645601(vc vs.85).aspx>, 7 pp.

ECMA, "Application Programming Interface for Windows", vol. 1, Standard ECMA-234, Dec. 31, 1995, 185 pp.

Patent Abstracts of Japan, Publication No. 2009-146394, published Jul. 2, 2009.

Patent Abstracts of Japan, Publication No. 2010-231703, published Oct. 14, 2010.

Patent Abstracts of Japan, Publication No. 2014-50096, published Mar. 17, 2014.

Chinese Office Action dated Jun. 19, 2017 in related Chinese Application 201510205511.1.

* cited by examiner

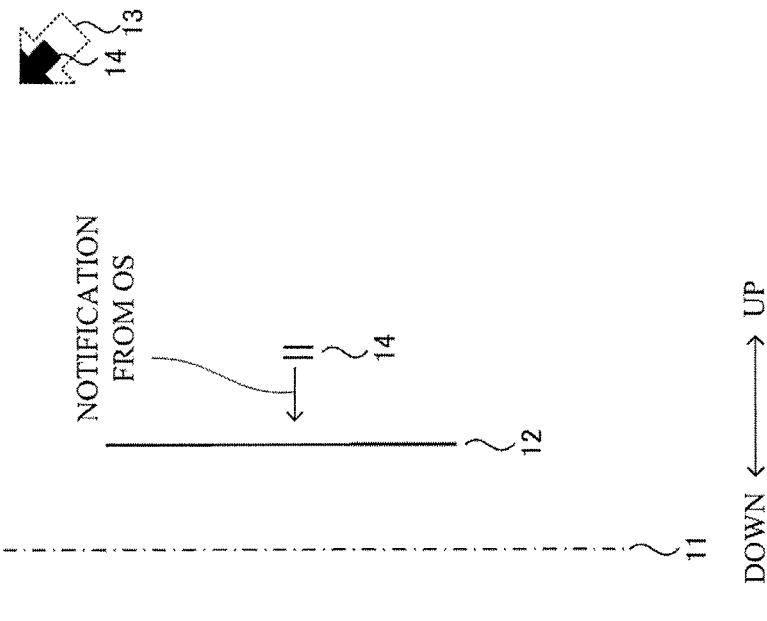
FIG. 2C PRIOR ART
FIG. 2B PRIOR ART
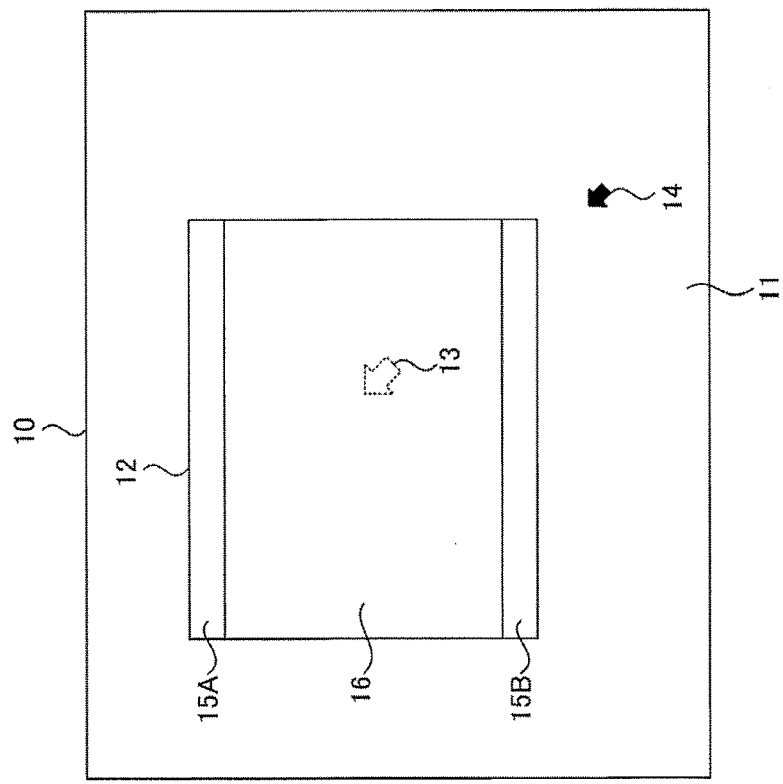
FIG. 2A PRIOR ART

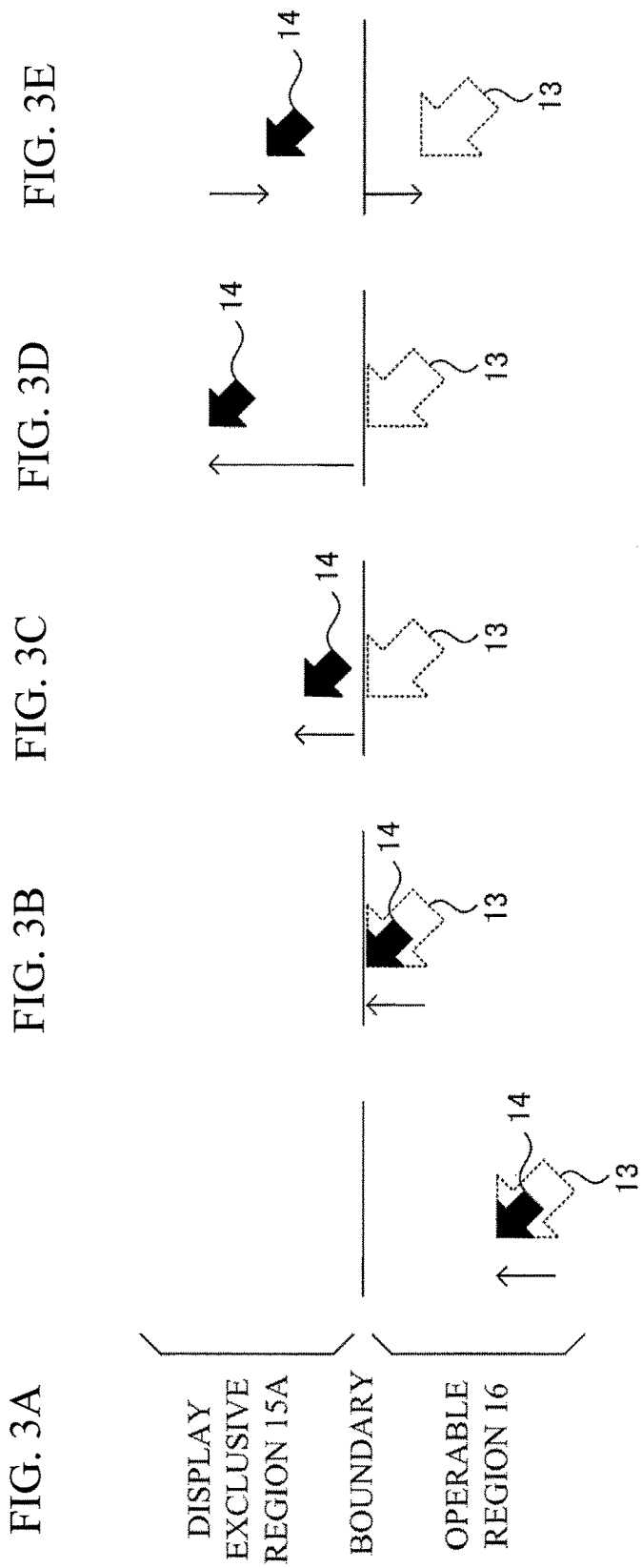

FIG. 7A    FIG. 7B    FIG. 7C
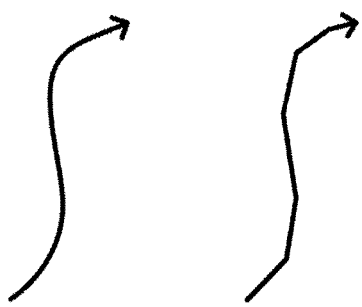
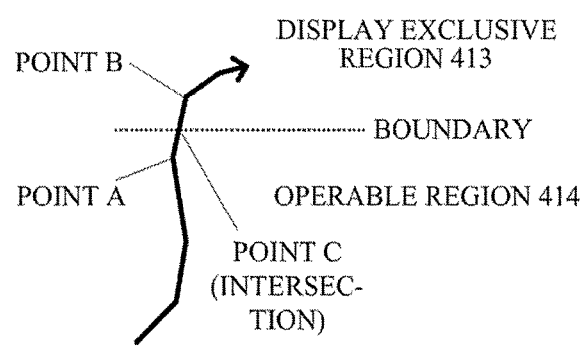

FIG. 15

| 1 | a | 50 |
| 2 | b | 50 |
| 3 | c | 50 |
| 4 | d | 50 |
| 5 | sizeX | 1024 |
| 6 | sizeY | 768 |
| 7 | ---- | |
| 8 | ---- | |

| ENT: SELECT | R: RESET |
| ESC: EXIT | S: SAVE |

COMPUTER READABLE MEDIUM, RELAY DEVICE AND INFORMATION PROCESSING DEVICE

CROSS-REFERENCE TO RELATED APPLICATION

This application is based upon and claims the benefit of priority of the prior Japanese Patent Application No. 2014-092730 filed on Apr. 28, 2014, the entire contents of which are incorporated herein by reference.

FIELD

A certain aspect of the embodiments is related to a computer readable medium, a relay device and an information processing device.

BACKGROUND

Conventionally, there has been known a client connected to a server via an IP-KVM (K: keyboard, V: video, M: mouse) switch (see Japanese Laid-open Patent Publication No. 2009-146394). Since the server may increase a movement amount of a mouse cursor transmitted from the client (i.e., the mouse cursor is accelerated), the movement amount to be transmitted from the client to the IP-KVM switch is adjusted in advance in order to prevent the server from increasing the movement amount transmitted from the client to the server.

In addition, there has been conventionally known a remote work process management system including: an IP-KVM device for receiving operation signals sent from a plurality of terminals placed at remote places through a network to operate a server of a local side; and a process management device provided between the network and the IP-KVM device (see Japanese Laid-open Patent Publication No. 2010-231703). In the system, the plurality of terminals manage the work procedure for the server with reference to the work process management information managed by the process management device.

FIG. 1 is a diagram illustrating a configuration of a communication system including a normal IP-KVM switch. The communication system of FIG. 1 includes a server 1, an IP-KVM switch 2, a remote terminal 4, a display 5, a keyboard 6 and a mouse 7. The IP-KVM switch 2 is provided in order to operate the server 1 from the remote terminal 4. The remote terminal 4 is a computer, for example, and is connected to the display 5, the keyboard 6 and the mouse 7. The server 1 is connected to the IP-KVM switch 2, and the IP-KVM switch 2 is connected to the remote terminal 4 via a network 3. The remote terminal 4 uses "Windows" as an operating system (OS). Software for IP-KVM is installed beforehand in the remote terminal 4. The software for IP-KVM is software for operating an operation screen of the server 1 from the remote terminal 4 via the IP-KVM switch 2.

FIG. 2A is a diagram illustrating an example of an operation screen 10 displayed on the display 5. FIG. 2B is a schematic diagram of a system displaying the operation screen 10 of FIG. 2A. In the OS such as "Windows (registered trademark)", there is an overlapping order for all objects such as a window and a mouse cursor. Since the overlapping order of the objects is incomprehensible in FIG. 2A, the overlapping order of the objects is illustrated in FIG. 2B.

As illustrated in FIG. 2B, a background 11 is arranged on a bottom, a window 12 is arranged and displayed on the background 11, and a mouse cursor 14 is arranged and displayed on the window 12. The OS which manages the objects manages a coordinate indicative of a position of the mouse 7, and draws the mouse cursor 14 at the managed position. Then, the OS notifies the window 12 located immediately below the drawn mouse cursor 14 of the coordinate of the mouse cursor 14.

As illustrated in FIG. 2A, the operation screen 10 displayed on the display 5 includes, for example, the background 11, and the window 12 to be displayed when the software for IP-KVM is executed. The window 12 displays a video signal outputted from the server 1. That is, the window 12 displays the operation screen of the server 1. A mouse cursor 13 is displayed on the window 12. The mouse cursor 13 is a mouse cursor which moves on the server 1. The mouse cursor 14 is displayed on the background 11. The mouse cursor 14 is a mouse cursor which moves on the remote terminal 4. Hereinafter, there is a case where the mouse cursor 13 is called the mouse cursor of the server and the mouse cursor 14 is called the mouse cursor of the remote terminal. For convenience of explanation, the mouse cursor 13 is illustrated by a dashed line, and the mouse cursor 14 is illustrated by a solid line. In fact, the mouse cursors 13 and 14 may have the same shape.

The window 12 includes display exclusive regions 15A and 15B, and an operable region 16. The display exclusive regions 15A and 15B are regions where only the display of data is performed and the mouse cursor 13 cannot move. The operable region 16 is a region where the display of data is performed and the mouse cursor 13 can move. The mouse cursor 14 can move to the display exclusive regions 15A and 15B and the operable region 16.

Since the mouse cursor 14 is located outside the window 12 in FIG. 2A, the mouse cursor 14 does not overlap with the mouse cursor 13. However, when the mouse cursor 14 is located inside the window 12, it is required that the mouse cursor 14 overlaps with the mouse cursor 13 as illustrated in FIG. 2C. This is because when the mouse cursor 14 does not overlap with the mouse cursor 13 in the window 12 to operate the operation screen of the server 1, an operability is poor.

When the mouse cursor 14 is located inside the window 12, the remote terminal 4 outputs coordinate data of the mouse cursor 14 to the server 1 via the IP-KVM switch 2. The server 1 moves the mouse cursor 13 based on the coordinate data. Then, when the mouse cursor 14 moves inside the window 12, the remote terminal 4 outputs data on the movement amount of the mouse cursor 14 to the server 1 via the IP-KVM switch 2, and the server 1 moves the mouse cursor 13 based on the data on the movement amount from the remote terminal 4. Therefore, the mouse cursor 13 follows the movement of the mouse cursor 14. Thereby, a user can operate the operation screen of the server 1 with the mouse cursor 14.

SUMMARY

According to a first aspect of the present invention, there is provided a non-transitory computer readable medium causing a computer to execute a process, the computer being connected to a server via an IP-KVM (K: keyboard, V: video, M: mouse) switch, displaying a first mouse cursor displayed on an operation screen of the server and a second mouse cursor displayed on an operation screen of the computer, and remotely operating the operation screen of the server, the process including: firstly acquiring coordinate information indicating a boundary between an operable region and an inoperable region in the operation screen of the server; secondly acquiring, from an operating system of the computer, an arrangement coordinate of a first window displaying the operation screen of the server including the first mouse cursor; detecting positions of the operable region and the inoperable region from the firstly acquired coordinate information and the secondly acquired arrangement coordinate; and interrupting notifying the first window of a coordinate of the second mouse cursor when the coordinate of the second mouse cursor acquired from the operating system of the computer is included in the inoperable region.

According to a second aspect of the present invention, there is provided a relay device connected between a server and an IP-KVM (K: keyboard, V: video, M: mouse) switch connected to a client, the client displaying a first mouse cursor displayed on an operation screen of the server and a second mouse cursor displayed on an operation screen of the client, and remotely operating the operation screen of the server, the relay device including: a first acquisition unit that acquires coordinate information indicating a boundary between an operable region and an inoperable region in the operation screen of the server, and size information of the operation screen of the server; a detector that detects positions of the operable region and the inoperable region from the coordinate information and the size information acquired by the first acquisition unit; a second acquisition unit that acquires a coordinate of the second mouse cursor from an alignment process of the first mouse cursor and the second mouse cursor executed by the client; and an interrupter that calculates a present coordinate of the second mouse cursor by adding a relative coordinate of the second mouse cursor acquired from the IP-KVM switch to a previous coordinate of the second mouse cursor, and interrupts notifying the server of the present coordinate of the second mouse cursor when the present coordinate of the second mouse cursor is included in the inoperable region.

According to a third aspect of the present invention, there is provided an information processing device that is connected to a server via an IP-KVM (K: keyboard, V: video, M: mouse) switch, displays a first mouse cursor displayed on an operation screen of the server and a second mouse cursor displayed on an operation screen of the information processing device, and remotely operates the operation screen of the server, the information processing device including: a first acquisition unit that acquires coordinate information indicating a boundary between an operable region and an inoperable region in the operation screen of the server; a second acquisition unit that acquires an arrangement coordinate of a first window from an operating system of the information processing device, the first window being created by software displaying the operation screen of the server on which the first mouse cursor is displayed; a detector that detects positions of the operable region and the inoperable region from the coordinate information acquired by the first acquisition unit and the arrangement coordinate of the first window acquired by the second acquisition unit; and an interrupter that interrupts notifying the first window of a coordinate of the second mouse cursor when the coordinate of the second mouse cursor acquired from the operating system of the computer is included in the inoperable region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating an example of an operation screen displayed on a display;

FIG. 2B is a schematic diagram of a system displaying the operation screen of FIG. 2A;

FIG. 2C is a diagram illustrating an example in which two mouse cursors 13 and 14 overlaps with each other;

FIGS. 3A to 3E are explanatory diagrams when the mouse cursor 14 deviates from the mouse cursor 13;

FIG. 7A is a diagram illustrating an example of the movement of a mouse;

FIG. 7B is a diagram schematically illustrating coordinate data corresponding to the movement of the mouse of FIG. 7A;

FIG. 7C is a diagram illustrating a process method of the coordinate data when the mouse cursor corresponding to the mouse of FIG. 7A exceeds a boundary between a display exclusive region and an operable region;

FIG. 15 is a diagram illustrating an example of an OSD (On-Screen Display) screen;

DESCRIPTION OF EMBODIMENTS

Figure 1:
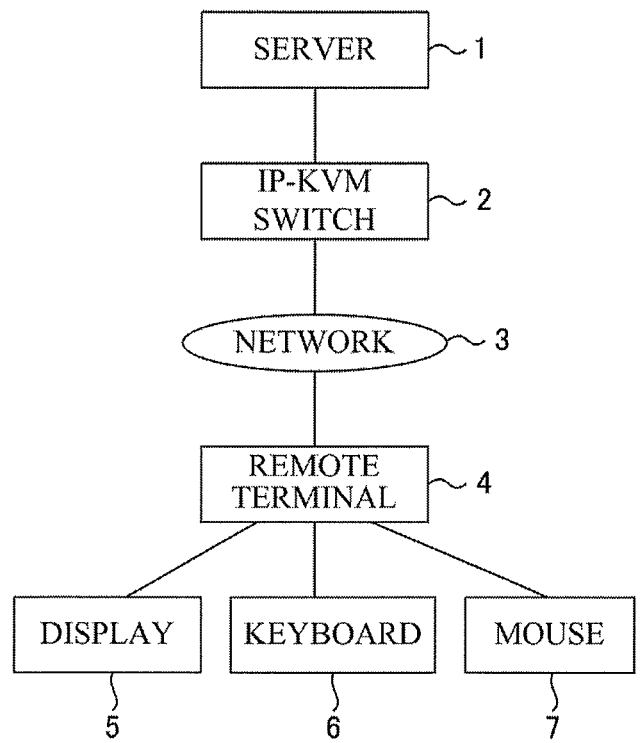
FIG. 1 is a diagram illustrating a configuration of a communication system including a normal IP-KVM switch.

In an example of FIG. 2A, even when the mouse cursor 14 is located inside the window 12, there is a case where the mouse cursor 14 does not overlap with the mouse cursor 13. That is, there is a case where the mouse cursor 14 deviates from the mouse cursor 13.

FIGS. 3A to 3E are explanatory diagrams when the mouse cursor 14 deviates from the mouse cursor 13. Here, it is assumed that the mouse cursor 14 moves from the operable region 16 to the display exclusive region 15A, and returns from the display exclusive region 15A to the operable region 16 again.

FIG. 3A indicates a state where the mouse cursors 14 and 13 are located on the operable region 16, and the mouse cursor 14 overlaps with the mouse cursor 13. When the user moves the mouse cursor 14 upward as illustrated in FIG. 3B, the mouse cursor 13 follows the movement of the mouse cursor 14. Moreover, when the user moves the mouse cursor 14 upward and the mouse cursor 14 enters the display exclusive region 15A from the operable region 16 as illustrated in FIG. 3C, the mouse cursor 13 stops at a boundary between the display exclusive region 15A and the operable region 16, and cannot enter the display exclusive region 15A. On the other hand, since the mouse cursor 14 can move inside the display exclusive region 15A, the position of the mouse cursor 14 deviates from the position of the mouse cursor 13 at this time.

In addition, when the user moves the mouse cursor 14 upward as illustrated in FIG. 3D, the mouse cursor 13 cannot follow the movement of the mouse cursor 14, and the deviation between the mouse cursor 14 and the mouse cursor 13 increases. Then, when the user moves the mouse cursor 14 downward as illustrated in FIG. 3E, the mouse cursor 13 follows the movement of the mouse cursor 14 and moves downward without overlapping with the mouse cursor 14.

A cause of the deviation is that, when the mouse cursor 14 moves inside the window 12, the server 1 always receive the data on the movement amount of the mouse cursor 14 transmitted from the remote terminal 4 via the IP-KVM switch 2, and limits a movement range of the mouse cursor 13 depending on the movement amount to the operable region 16.

A description will now be given of a present embodiment with reference to the drawings.

First Embodiment

Figure 4:
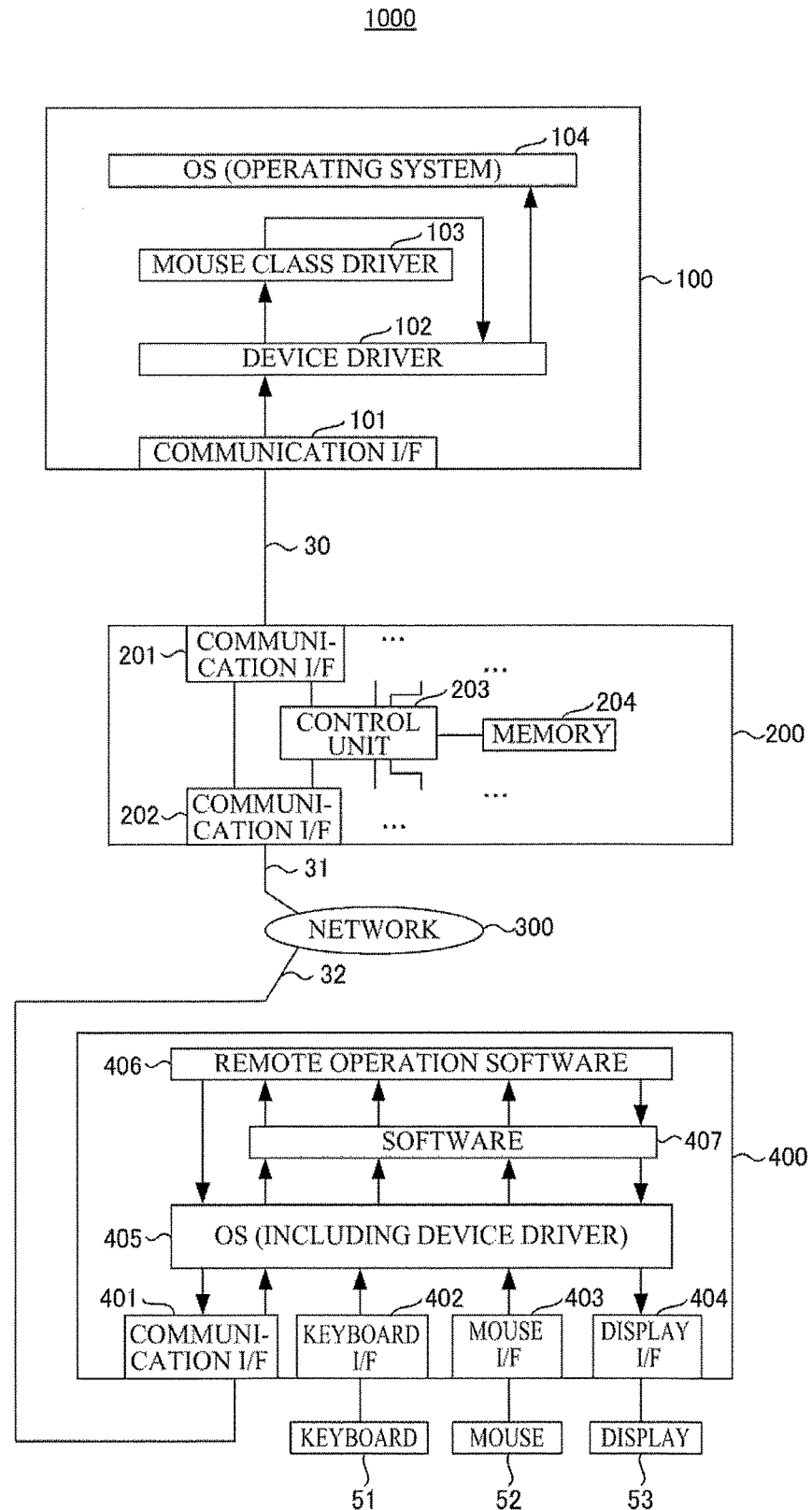
FIG. 4 is a schematic diagram illustrating a configuration of a remote system according to a first embodiment.

FIG. 4 is a schematic diagram illustrating a configuration of a remote system according to a first embodiment.

In FIG. 4, a remote system 1000 includes a server 100, an IP-KVM (K: keyboard, V: Video, M: mouse) switch 200, and a client 400. The IP-KVM switch 200 is a device for remotely operating an operation screen of the server 100 from the client 400. The server 100 is connected to the IP-KVM switch 200 via a communication cable 30. The client 400 is connected to the IP-KVM switch 200 via a network 300 and communication cables 31 and 32. The communication cable 30 is a USB (Universal Serial Bus) cable and a DVI (Digital Visual Interface) cable, for example. The communication cables 31 and 32 are LAN (Local Area Network) cables, for example. Although the remote system 1000 includes the server 100 and the client 400 in FIG. 4, the remote system 1000 may include a plurality of servers and a plurality of clients.

The server 100 includes: a communication interface (I/F) 101 to which the communication cable 30 is connected; a device driver 102 that extracts, from a packet received from the IP-KVM switch 200, coordinate data indicating a coordinate of a mouse cursor (e.g. they are indicated by relative coordinates) and button data indicating whether a button of a mouse is depressed, outputs those data to a mouse class driver 103, and interrupt-acquires coordinate data and button data to which the mouse class driver 103 outputs; the mouse class driver 103 that adds a movement amount of the mouse cursor by an acceleration/speed process to the coordinate data acquired from the device driver 102; and an operating system (OS) 104 that moves the mouse cursor based on the coordinate data received from the device driver 102. Although the OS 104 is Windows, UNIX (registered trademark), MAC OS, or the like, the Windows is mainly used for the present embodiment.

The acceleration/speed process means a process that adds the movement amount of the mouse cursor based on a movement speed or a movement acceleration of the mouse to the coordinate of the mouse cursor which the server 100 receives from the client 400 via the IP-KVM switch 200 and are indicated by the relative coordinate.

Here, validity and invalidity of the mouse class driver 103 can be switched by the setting of the OS 104 in the server 100. When the mouse class driver 103 is valid, the above-mentioned acceleration/speed process is performed. When the mouse class driver 103 is invalid, the above-mentioned acceleration/speed process is not performed. When the mouse class driver 103 is invalid, the device driver 102 directly transmits the coordinate data and the button data of the cursor to the OS 104.

The IP-KVM switch 200 includes: a communication I/F 201 that receives a video signal (hereinafter, the video signal is referred to as "screen data of the server 100") indicating the operation screen from the server 100 via the communication cable 30, and transmits the coordinate data and the button data to the server 100; a communication I/F 202 that receives from the client 400 the coordinate data, the button data and a key code from a keyboard 51, and transmits the screen data from the server 100 to the client 400; a control unit 203 that executes various processes and controls the whole device including the communication I/Fs 201 and 202; and a memory 204 that stores various data. The control unit 203 is composed of a microcomputer, and the memory 204 is composed of a hard disk drive or a nonvolatile memory. The number of communication I/Fs 201 and the number of communication I/Fs 202 are not limited to one, and may be two or more.

The client 400 includes: a communication I/F 401 that transmits the coordinate data and the button data of a mouse 52 and the key code from the keyboard 51 to the IP-KVM switch 200 via the network 300, and receives the screen data of the server 100 from the IP-KVM switch 200 via the network 300; a keyboard I/F 402 that receives the key code from the keyboard 51; a mouse I/F 403 that receives the coordinate data and the button data from the mouse 52; and a display I/F 404 that outputs the video signal indicating the operation screen of the client 400 to a display 53.

Moreover, the client 400 includes: an OS (Operating System) 405 including a plurality of device drivers which control the keyboard 51, the mouse 52 and the display 53; a remote operation software 406 that displays the screen data of the server 100 on the display 53 and is used for executing remote operation; and a software 407 that interrupts the coordinate data of the mouse cursor located in the display exclusive region (specifically, this corresponds to a display exclusive region included in the screen data of the server) included in the remote operation software 406 so as not to output them to the server 100. Functions to be realized by the software 407 are examples of a first acquisition unit, a second acquisition unit, a detector, an interrupter and an executer.

The OS 405 receives the screen data of the server 100 from the communication I/F 401, and outputs it to the remote operation software 406 via the software 407. Moreover, the OS 405 receives the key code from the keyboard I/F 402, and outputs it to the remote operation software 406 via the software 407. The OS 405 receives the coordinate data and the button data from the mouse I/F 403, and output them to the software 407. The software 407 interrupts the coordinate data and the button data of the mouse cursor located in the display exclusive region included in the remote operation software 406, does not output them to the remote operation software 406, and outputs the coordinate data and the button data of the mouse cursor located in the operable region other than the display exclusive region to the remote operation software 406. The display exclusive region functions as an inoperable region. Here, the display exclusive region and the operable region are described later.

Here, the remote operation software 406 includes a program module which executes the creation (i.e., the booting), the movement, the magnification, the reduction and the elimination (i.e., the completion) of a window 411 described later, or input and output of data. A process which the window 411 described later executes is achieved by a CPU (Central Processing Unit) executing a corresponding program. The software 407 includes a program module which executes the creation (i.e., the booting), the movement, the magnification, the reduction and the elimination (i.e., the completion) of a window 415 described later, notifies the window 411 of the coordinate data, or interrupts notifying the window 411 of the coordinate data. A process which the window 415 described later executes is achieved by the CPU executing a corresponding program.

Moreover, the OS 405 receives the key code, the coordinate data and the button data of the mouse cursor from the remote operation software 406, and outputs them to the server 100 via the communication I/F 401 and the IP-KVM switch 200.

Here, since the operation screen of the server 100 to be displayed by the process of the remote operation software 406 is displayed on the operation screen of the client 400, a coordinate system of the operation screen which the remote operation software 406 displays is different from that of the operation screen of the client 400. Therefore, when the coordinate data of the mouse cursor is communicated with the IP-KVM switch 200, the OS 405 adapts the coordinate data of the mouse cursor to the coordinate system of the remote operation software 406 from the coordinate system of the operation screen of client 400.

Figure 5A:
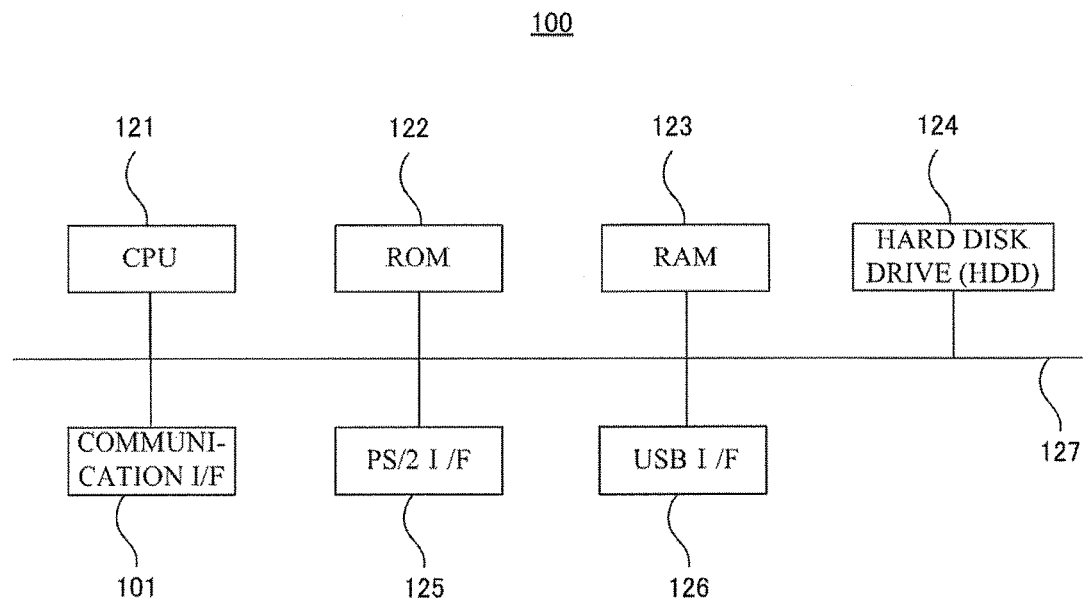
FIG. 5A is a block diagram illustrating a hardware configuration of a server.
Figure 5B:
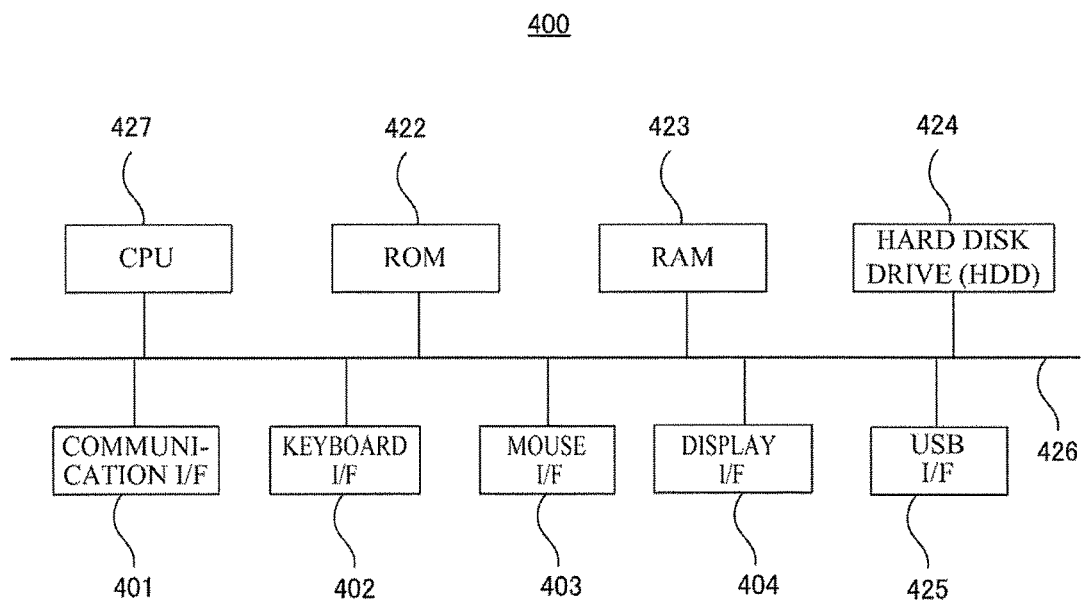
FIG. 5B is a block diagram illustrating a hardware configuration of a client.

FIG. 5A is a block diagram illustrating a hardware configuration of the server 100. FIG. 5B is a block diagram illustrating a hardware configuration of the client 400.

The server 100 includes: the communication I/F 101; a CPU 121 that controls the whole device; a ROM 122 that stores a control program; a RAM 123 that functions as a working area; a hard disk drive (HDD) 124 that stores the device driver 102, the mouse class driver 103, the OS 104, and various information and various programs; a PS/2 I/F 125; a USB I/F 126 for connecting to a USB device, not shown. The CPU 121 is connected to the communication I/F 101, the ROM 122, the RAM 123, the HDD 124, the PS/2 I/F 125 and the USB I/F 126 via a system bus 127.

Here, a process which the device driver 102, the mouse class driver 103 or the OS 104 executes is achieved by the CPU 121 which properly reads out the device driver 102, the mouse class driver 103 or the OS 104 from the HDD 124 to execute it.

The client 400 includes: the communication I/F 401; the keyboard I/F 402; the mouse I/F 403; the display I/F 404; a CPU 427 that controls the whole device; a ROM 422 that stores a control program; a RAM 423 that functions as a working area; a hard disk drive (HDD) 424 that stores the OS 405, the remote operation software 406, the software 407, and various information and various programs; a USB I/F 425 for connecting to a USB device, not shown. The CPU 427 is connected to the communication I/F 401, the keyboard I/F 402, the mouse I/F 403, the display I/F 404, the ROM 422, the RAM 423, the HDD 424 and the USB I/F 425 via a system bus 426.

Here, a process which the OS 405, the remote operation software 406 or the software 407 executes is achieved by the CPU 427 which properly reads out the OS 405, the remote operation software 406 or the software 407 to execute it.

Figure 6A:
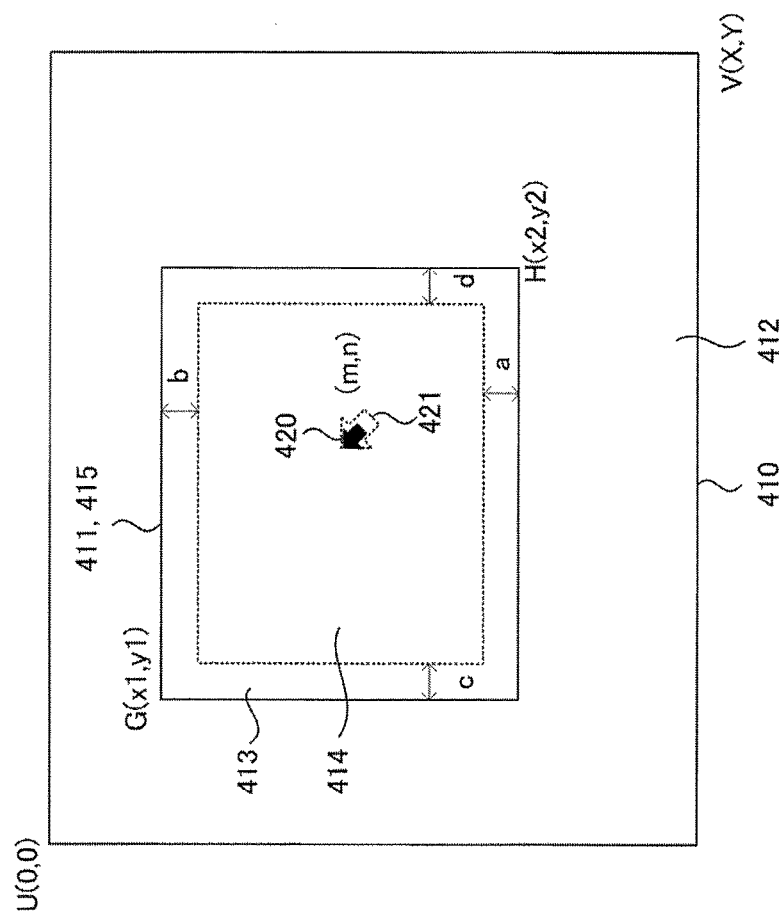
FIG. 6A is a diagram illustrating an example of the operation screen displayed on the display.
Figure 6B:
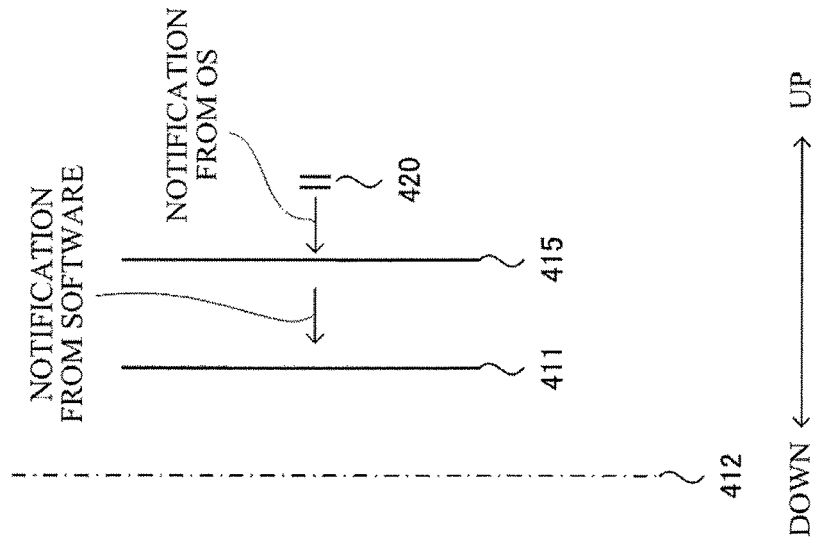
FIG. 6B is a schematic diagram illustrating a system displaying the operation screen of FIG. 6A.

FIG. 6A is a diagram illustrating an example of an operation screen 410 displayed on the display 53. FIG. 6B is a schematic diagram illustrating a system displaying the operation screen 410 of FIG. 6A.

As illustrated in FIG. 6A, the operation screen 410 displayed on the display 53 includes a background 412, and the window 411 to be displayed when the remote operation software 406 is executed. The window 415 to be displayed when the software 407 is executed is a transparent window, and is arranged so as to overlap with the window 411. It is assumed that a coordinate of a point U which is a left upper end of the operation screen 410 is (0, 0), and a coordinate of a point V which is a right bottom end of the operation screen 410 is (X, Y).

The video signal outputted from the server 100 is displayed on the window 411. That is, the window 411 displays the operation screen of the server 100. Mouse cursors 420 and 421 are displayed on the window 411. The mouse cursor 421 is a mouse cursor which operates on the server 100. The mouse cursor 420 is a mouse cursor which operates on the client 400. Hereinafter, there is a case where the mouse cursor 421 is called the mouse cursor of the server and the mouse cursor 420 is called the mouse cursor of the client. For convenience of explanation, the mouse cursor 421 is illustrated by a dashed line, and the mouse cursor 420 is illustrated by a solid line. In fact, the mouse cursors 420 and 421 may have the same shape.

The window 411 includes a display exclusive region 413 and an operable region 414. The operable region 414 is a region surrounded by a dashed line of FIG. 6A. The display exclusive region 413 is a region other than the operable region 414 in the window 411. The display exclusive region 413 is a region where only displaying data is executed and the mouse cursor 421 cannot move (i.e., the mouse cursor 421 cannot enter). The operable region 414 is a region where displaying data is executed and the mouse cursor 421 can move freely. The mouse cursor 421 is located inside the operable region 414. The mouse cursor 420 can freely move in the operation screen 410, and can be located not only inside but also outside the window 411. It is assumed that a coordinate of a point G which is a left upper end of the window 411 is (x1, y1), and a coordinate of a point H which is a right bottom end of the window 411 is (x2, y2). Moreover, it is assumed that widths of the bottom, the top, the left and the right of the display exclusive region 413 in the window 411 are "a", "b", "c" and "d", respectively.

In the OS such as "Windows" used in the present embodiment, there is an overlapping order for all objects such as the window and the mouse cursor. Since the overlapping order of the objects is incomprehensible in FIG. 6A, the overlapping order of the objects in the window system is illustrated in FIG. 6B. Hereinafter, the process to be executed by the software or the window system which displays the window is explained as a process which a corresponding window executes.

As illustrated in FIG. 6B, the background 412 is arranged on a bottom, the window 411 of the remote operation software 406 is arranged on the background 412. Moreover, the window 415 created by the software 407 is arranged on the window 411 of the remote operation software 406, and the mouse cursor 420 is arranged on the window 415 of the software 407.

The OS 405 which manages the objects manages a coordinate indicative of a position of the mouse 52, and draws the mouse cursor 420 at the managed position. Then, the OS 405 notifies the window 415 of the software 407 located immediately below the drawn mouse cursor 420 of the coordinate of the mouse cursor 420. Then, when the mouse cursor 420 is located on the operable region 414, the software 407 notifies the window 411 in the remote operation software 406 of the coordinate about the mouse cursor 420. When the mouse cursor 420 is located on the display exclusive region 413, the software 407 interrupts the coordinate of the mouse cursor 420 from the remote operation software 406, and hence does not notify the window 411 in the remote operation software 406 of the coordinate about the mouse cursor 420.

Here, in an example of FIG. 2B, the mouse cursor 14 is directly arranged on the window 12 of the software for IP-KVM. On the other hand, in the present embodiment, the window 415 of the software 407 is inserted between the window 411 of the remote operation software 406 and the mouse cursor 420. By the arrangement, the window 415 of the software 407 can receive the coordinate of the mouse cursor 420 prior to the window 411 of the remote operation software 406 as described above.

The window 415 of the software 407 always has a size to cover the window 411 of the remote operation software 406, is located in front of the window 411, and is the transparent window to prevent an operator from viewing itself. In the window 411 of the remote operation software 406, the movement, the magnification, the reduction, the elimination (i.e., the completion) and the creation (i.e., the booting) are executed by the operation of the operator. On the contrary, in the window 415 of the software 407, only the creation (i.e., the booting) is executed by the operation of the operator.

When a creation command of the window 415 is inputted, the software 407 checks whether the window 411 of the remote operation software 406 exists. When the window 411 of the remote operation software 406 does not exist, the software 407 cancels the creation of the window 415, i.e., does not boot the window 415. When the window 411 of the remote operation software 406 exists, the software 407 arranges the transparent window 415 having the same size as the window 411 at the same position as the window 411 so as to cover the window 411 of the remote operation software 406.

After the window 415 is created, the software 407 executes selectively any one of a process that directly notifies the remote operation software 406 of the coordinate of the mouse cursor 420 notified from the OS 405, a process that processes the coordinate of the mouse cursor 420 notified from the OS 405 and notifies the remote operation software 406 of the processed coordinate of the mouse cursor 420, or a process that does not notify the remote operation software 406 of the coordinate of the mouse cursor 420 notified from the OS 405.

The software 407 needs information not acquired from the OS 405 in order to determine whether to directly notify the remote operation software 406 of the coordinate of the mouse cursor 420, to process the coordinate of the mouse cursor 420 and notify the remote operation software 406 of the processed coordinate of the mouse cursor 420, or not to notify the remote operation software 406 of the coordinate of the mouse cursor 420. The information is coordinate information indicating the boundary between the display exclusive region 413 and the operable region 414. Specifically, the information is the above-mentioned information of "a", "b", "c" and "d" which indicate the widths of the bottom, the top, the left and the right of the display exclusive region 413, respectively. Before determining direct notification of the coordinate of the mouse cursor 420, notification of the processed coordinate of the mouse cursor 420 or non-notification of the coordinate of the mouse cursor 420, the software 407 acquires the coordinate information indicating the boundary between the display exclusive region 413 and the operable region 414. A method for acquiring the coordinate information may be a well-known method. For example, the software 407 reads out the coordinate information from a file which stores the coordinate information indicating the boundary between the display exclusive region 413 and the operable region 414, and stores the coordinate information into internal parameters of the software 407.

A description will be given of processing the coordinate of the mouse cursor 420 and notifying the remote operation software 406 of the coordinate of the mouse cursor 420, with reference to FIGS. 7A to 7C. FIG. 7A is a diagram illustrating an example of the movement of the mouse 52. FIG. 7B is a diagram schematically illustrating coordinate data corresponding to the movement of the mouse 52 of FIG. 7A. FIG. 7C is a diagram illustrating a process method of the coordinate data when the mouse cursor 420 corresponding to the mouse of FIG. 7A exceeds the boundary between the display exclusive region 413 and the operable region 414.

As illustrated in FIG. 7A, the movement of the mouse 52 is continuous. However, since the coordinate data corresponding to the movement of the mouse 52 of FIG. 7A is inputted periodically, the movement of the mouse cursor 420 becomes continuous straight lines, as illustrated in FIG. 7B. Then, when the mouse cursor 420 exceeds the boundary between the display exclusive region 413 and the operable region 414 as illustrated in FIG. 7C, the window 415 of the software 407 receives the coordinate data of a point A. Since the coordinate of the point A exist in the operable region 414, the window 415 directly notifies the window 411 in the remote operation software 406 of the coordinate data of the point A. Next, when the window 415 of the software 407 receives the coordinate data of a point B from the OS 405, the coordinate of the point B exist in the display exclusive region 413. Therefore, the software 407 calculates a coordinate of a point C which is an intersection of the boundary and a straight line connecting the points A and B, based on the coordinate data of the points A and B and the coordinate information indicating the boundary between the display exclusive region 413 and the operable region 414, and notifies the window 411 in the remote operation software 406 of the coordinate data of the point C. Thereby, only the coordinate of the mouse cursor 420 in the operable region 414 is notified to the window 411 in the remote operation software 406.

The remote operation software 406 calculates a difference between a coordinate previously notified from the software 407 and a coordinate presently notified from the software 407, and notifies the IP-KVM switch 200 of the difference as a moving distance (indicated by a relative coordinate).

When the window 411 of the remote operation software 406 is moved, a movement command and a coordinate of a movement destination are notified from the OS 405 to the software 407. The software 407 moves the window 415 in accordance with this notification, and notifies the remote operation software 406 of information indicative of having moved the window 415. Since the remote operation software 406 moves the window 411 in accordance with the notification from the software 407, the positions of the windows 415 and 411 do not deviate from each other.

When the window 411 of the remote operation software 406 is magnified or reduced, a command of the magnification or the reduction and an arrangement coordinate after the magnification or the reduction are notified from the OS 405 to the software 407, as with the movement of the window 411. The software 407 magnifies or reduces the window 415 in accordance with the notification, and notifies the remote operation software 406 of information indicative of having magnified or reduced the window 415. The remote operation software 406 magnifies or reduces the window 411 in accordance with the notification from the software 407.

Eliminating the window 411 of the remote operation software 406 is to terminate the remote operation software 406. Therefore, when the software 407 receives a completion command of the remote operation software 406 from the OS 405, the software 407 closes the window 415 and also finishes its own operation.

Figure 8:
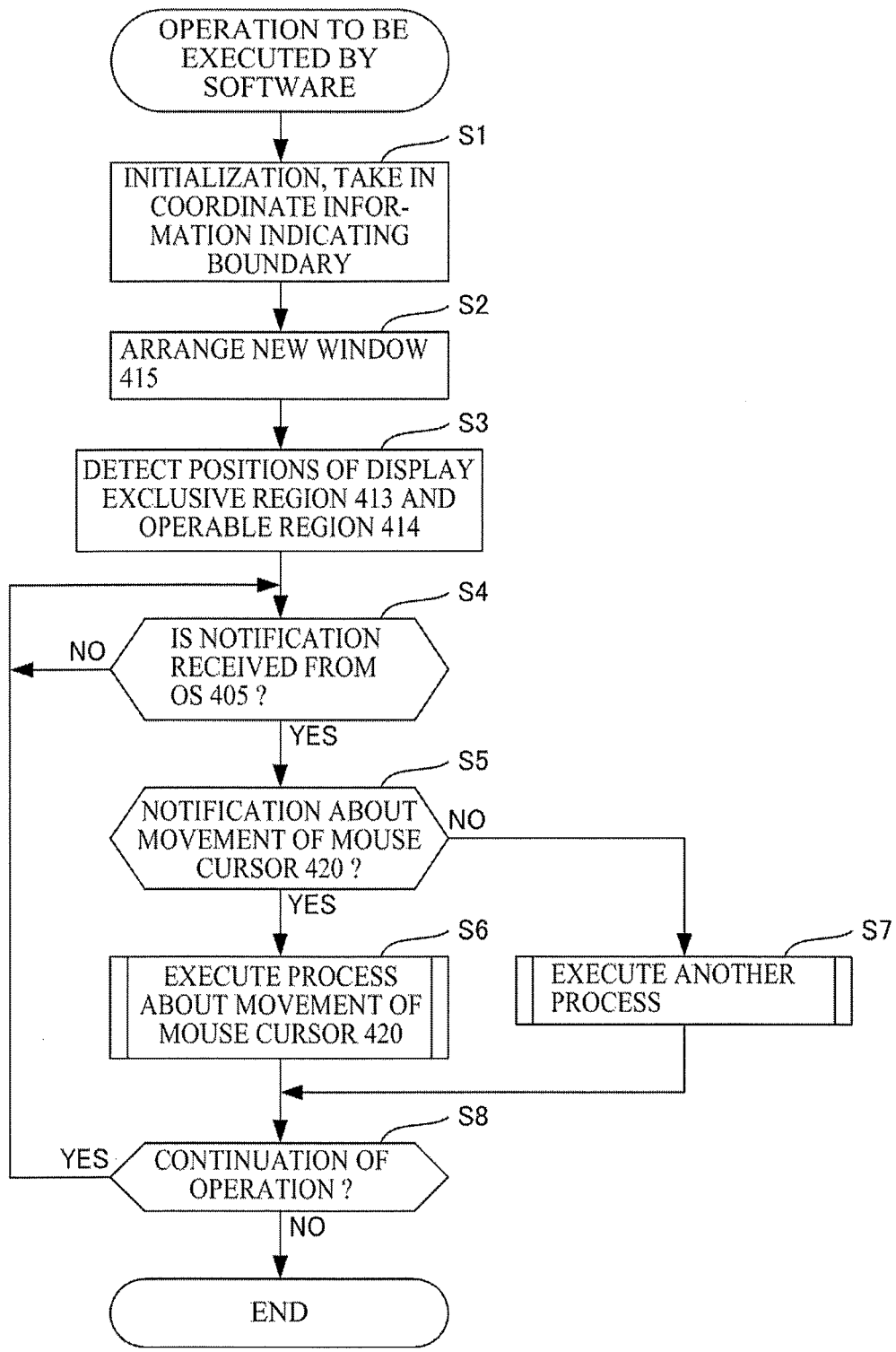
FIG. 8 is a flowchart illustrating operation to be executed by software.

FIG. 8 is a flowchart illustrating the operation to be executed by the software 407. Here, it is assumed that, with reference to FIG. 6A, a region of the background 412, i.e., a desktop region of the OS 405 is "(0, 0)-(X, Y)", a region of the window 411 of the remote operation software 406 is "(x1, y1)-(x2, y2)", the operable region 414 is "(x1+c, y1+b)-(x2-d, y2-a)", and the coordinate of the mouse cursor 420 notified from the OS 405 is "(m, n)".

When the operation of the software 407 is first started on the OS 405, the software 407 executes a necessary initialization process between the OS 405 and the software 407 in order to create a new window 415, and takes in, from the outside, the coordinate information ("a"-"d") indicating the boundary between the display exclusive region 413 and the operable region 414 and determining the operable region 414 (step S1). The coordinate information indicating the boundary between the display exclusive region 413 and the operable region 414 may be read from a file, for example, or may be inputted via the user interface by the operator.

The software 407 acquires the arrangement coordinate "(x1, y1)-(x2, y2)" of the window 411 of the remote operation software 406 from the OS 405, and arranges the window 415 in conformity to the arrangement coordinate of the window 411 (step S2). Thereby, the window 415 is arranged so as to overlap with the window 411.

Moreover, the software 407 detects positions of the display exclusive region 413 and the operable region 414 from the coordinate information indicating the boundary between the display exclusive region 413 and the operable region 414 acquired by step S1 and the arrangement coordinate of the window 411 acquired by step S2 (step S3). Specifically, the software 407 detects that the operable region 414 is "(x1+c, y1+b)-(x2-d, y2-a)" from the arrangement coordinate "(x1, y1)-(x2, y2)" of the window 411 and the coordinate information ("a"-"d") indicating the boundary between the display exclusive region 413 and the operable region 414. Moreover, the software 407 sets a region other than the operable region 414 in the arrangement coordinate of the window 411, as the display exclusive region 413.

The software 407 determines whether the notification is received from the OS 405 (step S4). When the notification is not received from the OS 405 (NO in step S4), the determination of step S4 is repeated. On the contrary, when the notification is received from the OS 405 (YES in step S4), the software 407 determines whether the notification is a notification about the movement of the mouse cursor 420 (step S5). When the notification received from the OS 405 is the notification about the movement of the mouse cursor 420 (YES in step S5), the software 407 executes a process about the movement of the mouse cursor 420 as described later (step S6).

When the notification received from the OS 405 is not the notification about the movement of the mouse cursor 420 (NO in step S5), the software 407 executes another process described later (step S7). After step S6 or step S7, the software 407 determines whether to continue the operation (step S8). Unless the software 407 receives a completion command of the remote operation software 406, the software 407 continues the operation. When the operation is continued (YES in step S8), the procedure returns to step S4. When the operation is not continued (NO in step S8), the present process is terminated.

Figure 9:
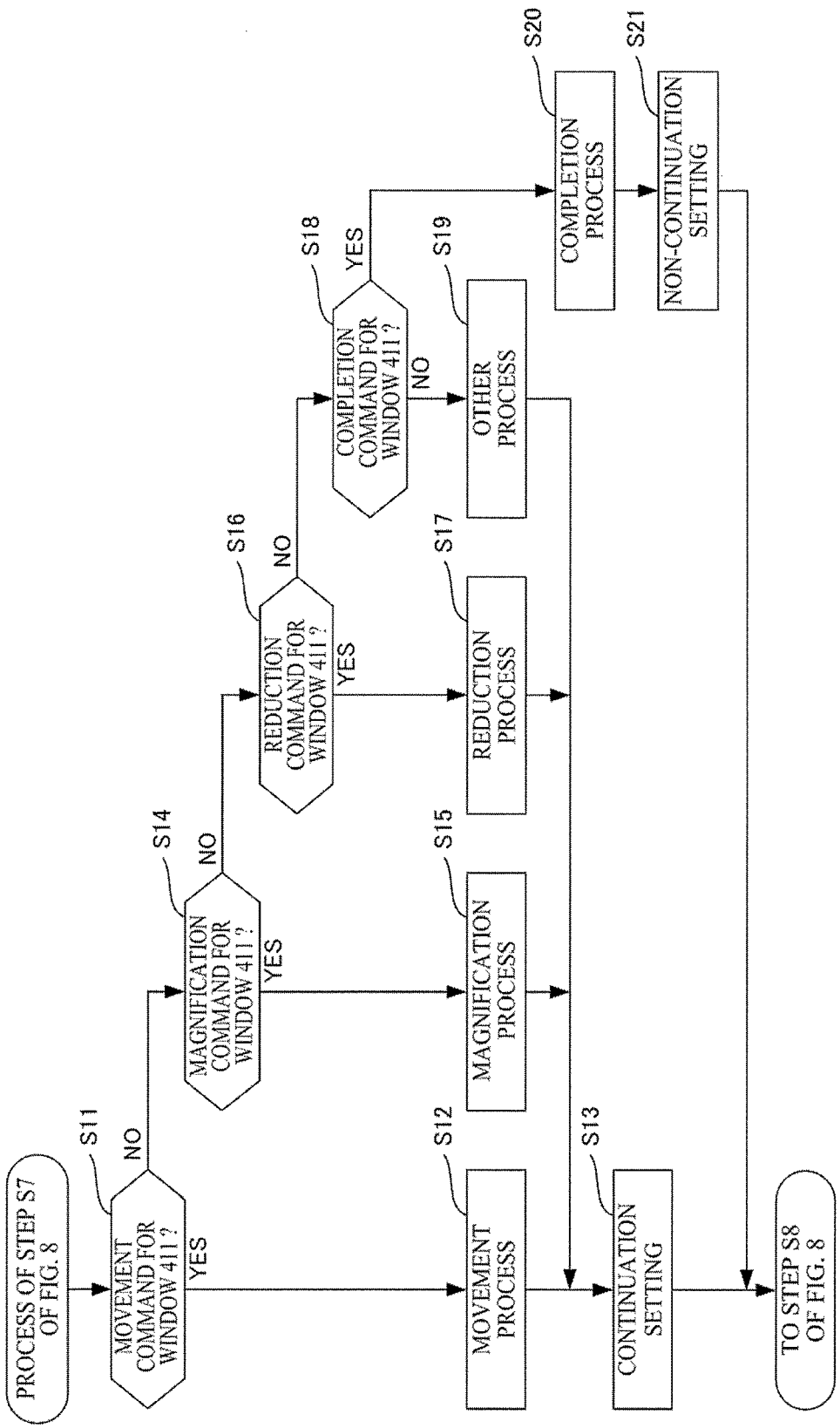
FIG. 9 is a flowchart illustrating another process of step S7 of FIG. 8.

FIG. 9 is a flowchart illustrating another process of step S7 of FIG. 8.

First, the software 407 determines whether the notification received from the OS 405 is a movement command for the window 411 of the remote operation software 406 (step S11). When the notification received from the OS 405 is the movement command for the window 411 of the remote operation software 406 (YES in step S11), the software 407 moves the window 415 based on a coordinate of a movement destination of the window 411 attached to the movement command for the window 411 (step S12). Then, the software 407 sets the continuation of its own movement (step S13), and the procedure advances to step S8 of FIG. 8.

When the notification received from the OS 405 is not the movement command for the window 411 of the remote operation software 406 (NO in step S11), the software 407 determines whether the notification received from the OS 405 is a magnification command for the window 411 of the remote operation software 406 (step S14).

When the notification received from the OS 405 is the magnification command for the window 411 of the remote operation software 406 (YES in step S14), the software 407 magnifies the window 415 based on an arrangement coordinate after the magnification of the window 411 attached to the magnification command for the window 411 (step S15). Moreover, the software 407 calculates a ratio of an arrangement coordinate "(x1, y1)'-(x2, y2)'" of the window 411 after magnification and an arrangement coordinate "(x1, y1)-(x2, y2)" of the window 411 before magnification, and magnifies the operable region 414 before magnification with the calculated ratio (step S15). Thereby, a size ratio of the window 411 and the operable region 414 after the magnification of the window 411 can be made to coincide with a size ratio before the magnification of the window 411. After step S15, the procedure advances to step S13.

When the notification received from the OS 405 is not the magnification command for the window 411 of the remote operation software 406 (NO in step S14), the software 407 determines whether the notification received from the OS 405 is a reduction command for the window 411 of the remote operation software 406 (step S16).

When the notification received from the OS 405 is the reduction command for the window 411 of the remote operation software 406 (YES in step S16), the software 407 reduces the window 415 based on an arrangement coordinate after the reduction of the window 411 attached to the reduction command for the window 411 (step S17). Moreover, the software 407 calculates a ratio of an arrangement coordinate "(x1, y1)"-(x2, y2)"" of the window 411 after reduction and an arrangement coordinate "(x1, y1)-(x2, y2)" of the window 411 before reduction, and reduces the operable region 414 before reduction with the calculated ratio (step S17). Thereby, a size ratio of the window 411 and the operable region 414 after the reduction of the window 411 can be made to coincide with a size ratio before the reduction of the window 411. After step S17, the procedure advances to step S13.

When the notification received from the OS 405 is not the reduction command for the window 411 of the remote operation software 406 (No in step S16), the software 407 determines whether the notification received from the OS 405 is a completion command of the remote operation software 406 (step S18). When the notification received from the OS 405 is not the completion command of the remote operation software 406 (No in step S18), the software 407 executes a process in response to the notification received from the OS 405 (step S19). The procedure advances to step S13.

When the notification received from the OS 405 is the completion command of the remote operation software 406 (YES in step S18), the software 407 closes the window 415 in order to complete (step S20), the software 407 sets the non-continuation of its own movement (step S21), and the procedure advances to step S8 of FIG. 8.

Figure 10:
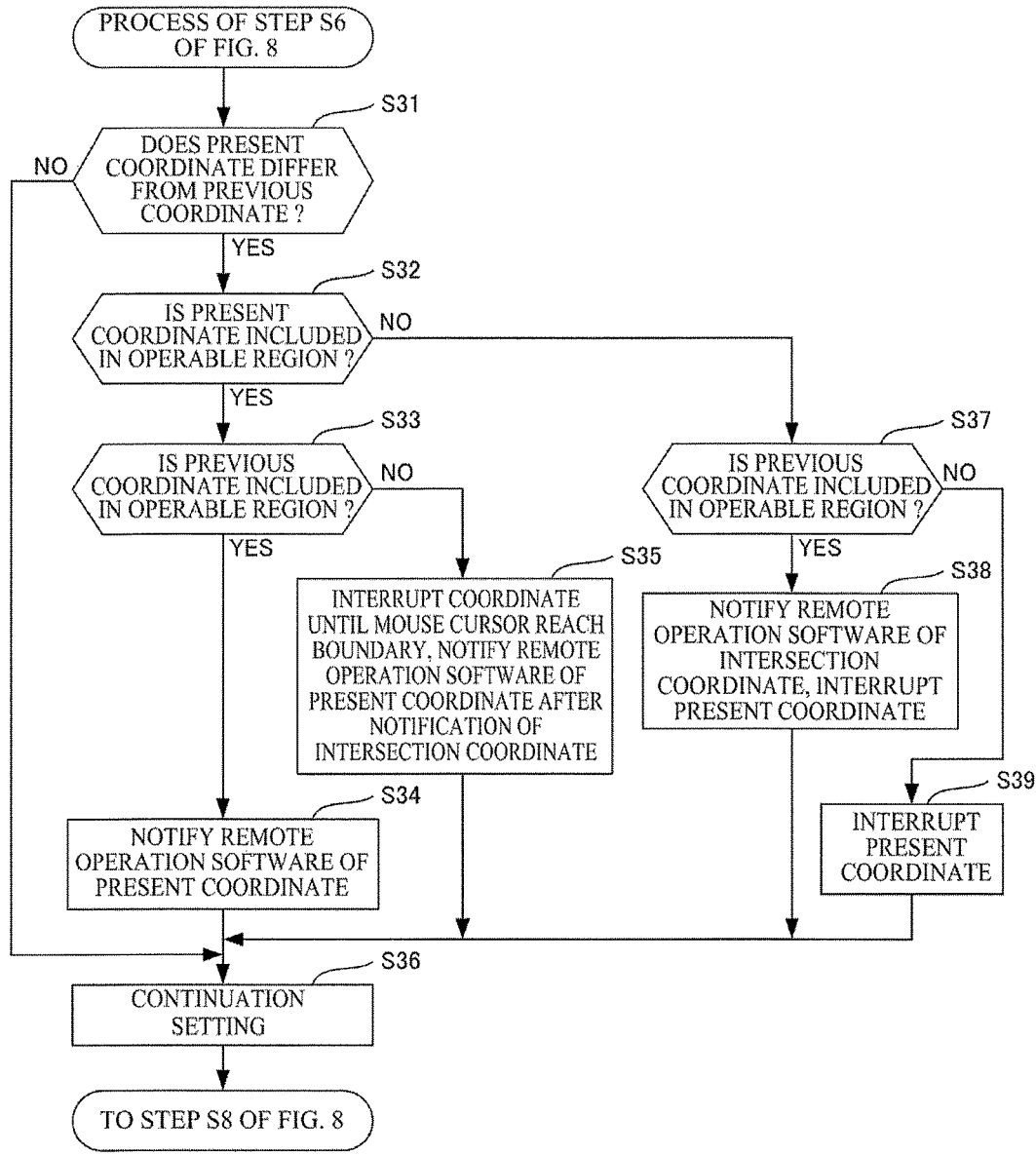
FIG. 10 is a flowchart illustrating a process about the movement of the mouse cursor in step S6 of FIG. 8.

FIG. 10 is a flowchart illustrating a process about the movement of the mouse cursor 420 in step S6 of FIG. 8.

First, the software 407 determines whether the coordinate of the mouse cursor 420 presently received from the OS 405 differs from the previously received coordinate of the mouse cursor 420 (step S31). When the coordinate of the mouse cursor 420 presently received from the OS 405 is the same as the previously received coordinate of the mouse cursor 420 (NO in step S31), the software 407 sets the continuation of its own movement (step S36) since a movement process of the mouse cursor 420 is unnecessary, and the procedure advances to step S8 of FIG. 8.

When the coordinate of the mouse cursor 420 presently received from the OS 405 differs from the previously received coordinate of the mouse cursor 420 (YES in step S31), the software 407 determines whether the coordinate of the mouse cursor 420 presently received from the OS 405 is included in the operable region 414 (step S32).

When the coordinate of the mouse cursor 420 presently received from the OS 405 is included in the operable region 414 (YES in step S32), the software 407 determines whether the coordinate of the mouse cursor 420 previously received from the OS 405 (i.e., a coordinate of the mouse cursor 420 of a present location) is included in the operable region 414 (step S33).

When the coordinate of the mouse cursor 420 previously received from the OS 405 is included in the operable region 414 (YES in step S33), the mouse cursor 420 moves in the operable region 414, and hence the software 407 directly notifies the remote operation software 406 of the coordinate of the mouse cursor 420 presently received from the OS 405 (step S34). The procedure advances to step S36.

When the coordinate of the mouse cursor 420 previously received from the OS 405 is not included in the operable region 414 (NO in step S33), the software 407 calculates an intersection of the boundary between the display exclusive region 413 and the operable region 414, and a straight line connecting the presently received coordinate of the mouse cursor 420 and the previously received coordinate of the mouse cursor 420, notifies the remote operation software 406 of a coordinate of the intersection, and then notifies the remote operation software 406 of the presently received coordinate of the mouse cursor 420 (step S35). The procedure advances to step S36. In this case, since the mouse cursor 420 moves from the display exclusive region 413 to the operable region 414, the coordinate of the intersection is notified to the remote operation software 406, so that the mouse cursor 421 overlaps with the mouse cursor 420 when the mouse cursor 420 enters the operable region 414. Then, the presently received coordinate of the mouse cursor 420 is notified to the remote operation software 406, so that the mouse cursor 421 follows the movement of the mouse cursor 420. Moreover, until the mouse cursor 420 reaches the boundary between the display exclusive region 413 and the operable region 414 from the outside of the operable region 414, the software 407 does not notify the remote operation software 406 of the coordinate of the mouse cursor 420 and interrupts the coordinate of the mouse cursor 420 (step S35).

When the coordinate of the mouse cursor 420 presently received from the OS 405 is not included in the operable region 414 (NO in step S32), the software 407 determines whether the coordinate of the mouse cursor 420 previously received from the OS 405 is included in the operable region 414 (step S37).

When the coordinate of the mouse cursor 420 previously received from the OS 405 is included in the operable region 414 (YES in step S37), the software 407 calculates an intersection of the boundary between the display exclusive region 413 and the operable region 414, and the straight line connecting the presently received coordinate of the mouse cursor 420 and the previously received coordinate of the mouse cursor 420, notifies the remote operation software 406 of the coordinate of the intersection, does not notify the remote operation software 406 of the presently received coordinate of the mouse cursor 420 and interrupts the coordinate of the mouse cursor 420 (step S38). Then, the procedure advances to step S36. In this case, since the mouse cursor 420 moves from the operable region 414 to the display exclusive region 413, the coordinate of the intersection is notified to the remote operation software 406, so that the mouse cursor 421 follows the movement of the mouse cursor 420 until reaching the boundary, and stops at the coordinate of the intersection.

When the coordinate of the mouse cursor 420 previously received from the OS 405 is not included in the operable region 414 (NO in step S37), since the mouse cursor 420 moves in the display exclusive region 413 (outside the operable region 414), the software 407 does not notify the remote operation software 406 of the presently received coordinate of the mouse cursor 420, and interrupts the presently received coordinate of the mouse cursor 420 (step S39). Then, the procedure advances to step S36.

As described above, the software 407 acquires the coordinate information ("a"-"d") indicating the boundary between the display exclusive region 413 and the operable region 414 (step S1), acquires the arrangement coordinate of the window 411 of the remote operation software 406 from the OS 405, and arranges the window 415 in conformity to the arrangement coordinate of the window 411 (step S2). Then, the software 407 detects positions of the display exclusive region 413 and the operable region 414 from the coordinate information indicating the boundary between the display exclusive region 413 and the operable region 414 acquired by step S1 and the arrangement coordinate of the window 411 acquired by step S2 (step S3). When the coordinate of the mouse cursor acquired from the OS 405 is included in the display exclusive region 413 which the mouse cursor 421 operating on the server 100 cannot enter, the software 407 does not notify the remote operation software 406 of the coordinate of the mouse cursor 420, and interrupts the coordinate of the mouse cursor 420 (steps S35, S38 and S39). Therefore, it is possible to suppress the deviation between the mouse cursor 421 operating on the server 100 and the mouse cursor 420 operating on the client 400.

Second Embodiment

A communication system according to the second embodiment is the same as the communication system of FIG. 4 according to the first embodiment.

In the first embodiment, the window 415 of the software 407 is arranged on the window 411 of the remote operation software 406, and the window 415 acquires the coordinate of the mouse cursor 420 outputted from the OS 405 prior to the window 411. In the second embodiment, the software 407 does not create the window 415 and uses a message hook function which the OS 405 (i.e., Windows) provides.

In the Windows, a mechanism to snatch the notification to be transmitted to a target window like a SetWindowHookEx function in a Win32 API function is prepared. The software 407 includes a hook function that snatches or detects the coordinate of the mouse cursor 420 to be outputted from the OS 405 to the window 411 of the remote operation software 406. The hook function is an example of a snatch unit.

Figure 11:
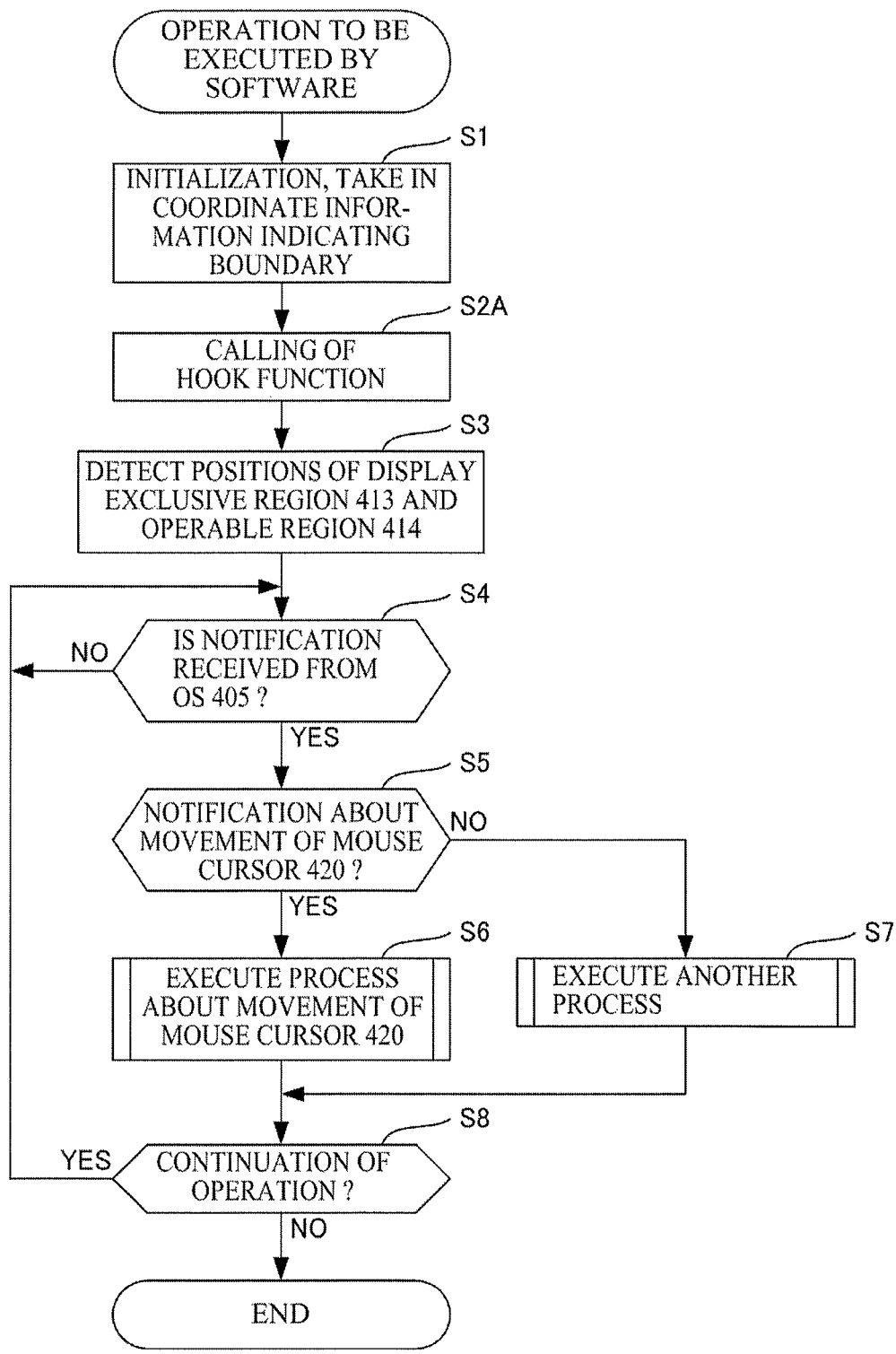
FIG. 11 is a flowchart illustrating operation to be executed by the software according to a second embodiment.

FIG. 11 is a flowchart illustrating the operation to be executed by the software 407 according to a second embodiment. Since the flowchart of FIG. 11 is different from that of FIG. 8 in step S8 of FIG. 8, only a different portion is explained.

The software 407 executes the calling of the hook function as substitute for the arrangement of the new window 415 of step S2 in FIG. 8 (step S2A). Since the other processes are the same as corresponding processes described in the first embodiment, description thereof is omitted.

According to the second embodiment, in substitution for the window 415, the hook function included in the software 407 snatches the coordinate of the mouse cursor 420 to be outputted from the OS 405 to the window 411 of the remote operation software 406. Therefore, the software 407 according to the second embodiment can execute the same process as the software 407 according to the first embodiment. As a result, the second embodiment can acquire the same effects as the first embodiment.

Third Embodiment

In the first and the second embodiment, the software 407 is used in order to suppress the deviation between the mouse cursor 421 and the mouse cursor 420. In a third embodiment, the deviation between the mouse cursor 421 and the mouse cursor 420 is suppressed by using hardware other than the server 100, the IP-KVM switch 200 and client 400.

Figure 12:
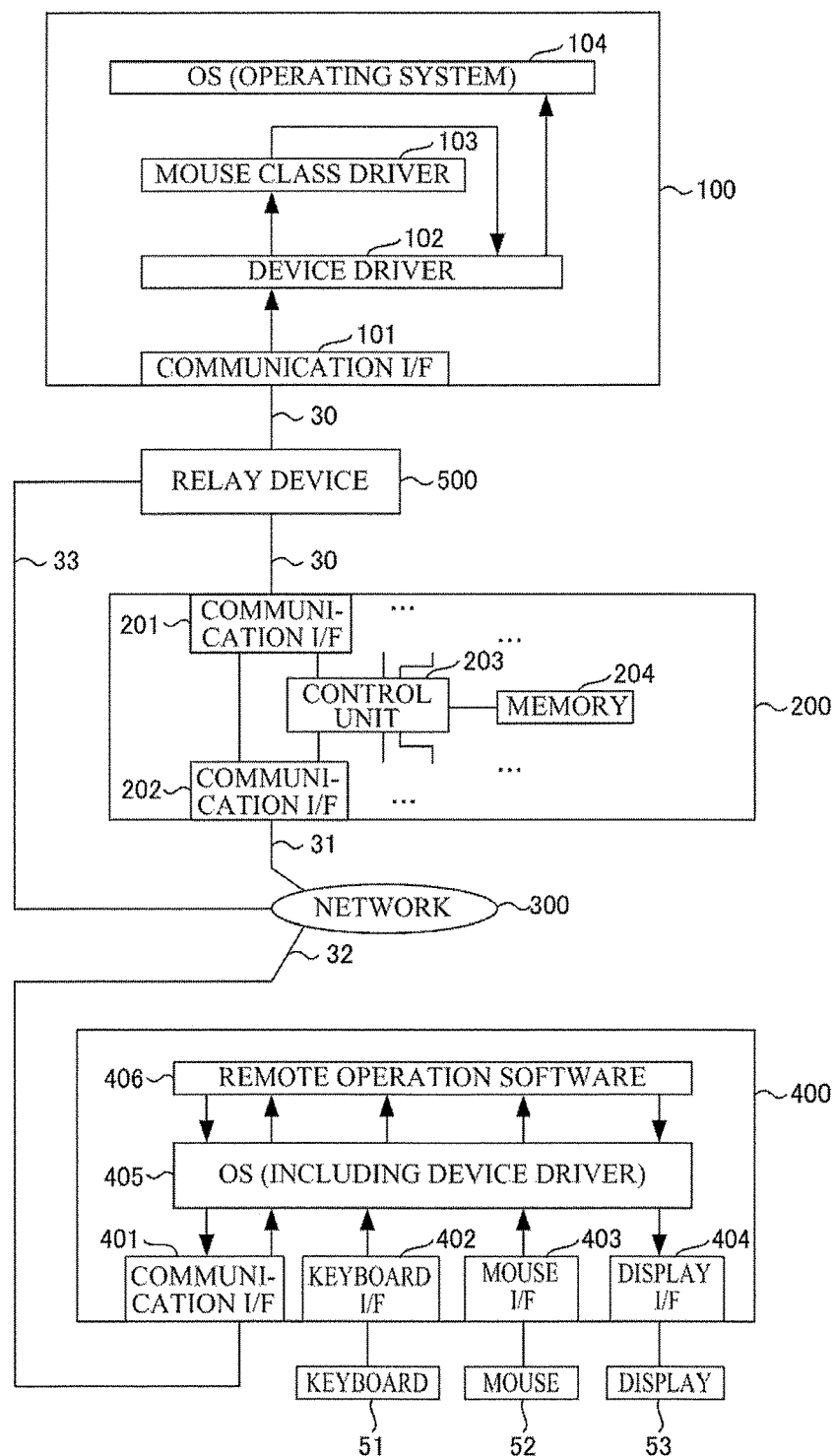
FIG. 12 is a schematic diagram illustrating a configuration of a remote system according to a third embodiment.

FIG. 12 is a schematic diagram illustrating a configuration of a remote system according to the third embodiment.

A remote system 1001 of FIG. 12 differs in including a relay device 500 from the remote system 1000 of FIG. 4. The client 400 does not include the software 407. The relay device 500 is connected between the server 100 and the IP-KVM switch 200 via the communication cables 30. Each of the communication cables 30 is the USB (Universal Serial Bus) cable and the DVI (Digital Visual Interface) cable, for example. Moreover, the relay device 500 is connectable to the network 300 via a communication cables 33. The communication cables 33 is a LAN (Local Area Network) cable, for example. Since other configuration of the remote system 1001 is the same as that of the remote system 1000 of FIG. 4, description thereof is omitted.

Figure 13:
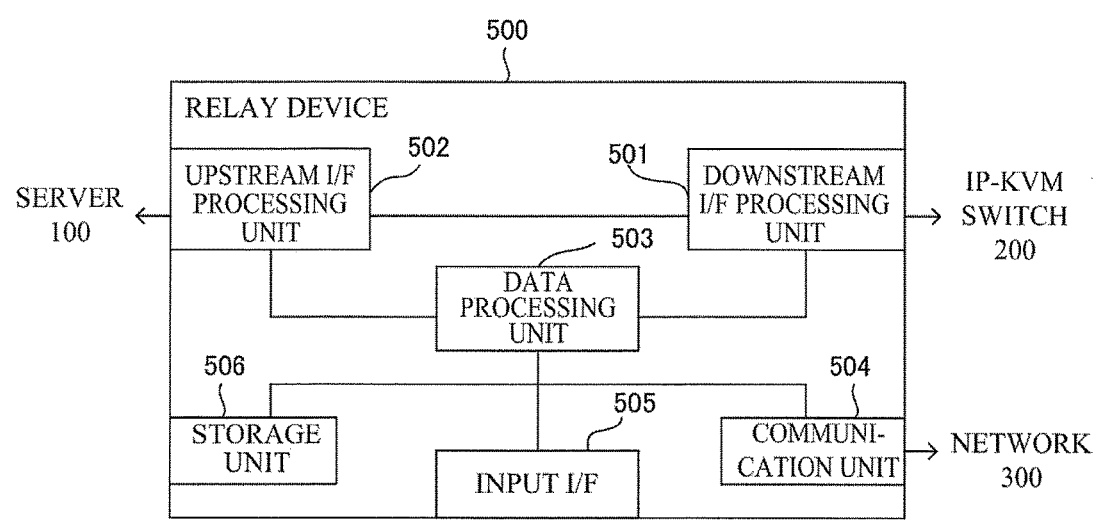
FIG. 13 is a block diagram illustrating a schematic configuration of a relay device.

FIG. 13 is a block diagram illustrating a schematic configuration of the relay device 500.

The relay device 500 includes a downstream interface (I/F) processing unit 501; an upstream I/F processing unit 502, a data processing unit 503, a communication unit 504, an input I/F 505 and a storage unit 506. The functions of the downstream I/F processing unit 501, the upstream I/F processing unit 502, the data processing unit 503, the communication unit 504, the input I/F 505 and the storage unit 506 are achieved by a microcomputer. The data processing unit 503 is an example of the detector, the second acquisition unit and the interrupter. The downstream I/F processing unit 501, the communication unit 504 and the input I/F 505 are an example of the first acquisition unit. The communication unit 504 is an example of a communicator.

The downstream I/F processing unit 501 is connected to the IP-KVM switch 200 via the communication cable 30, receives the coordinate data of the mouse cursor 420 and the button data, and outputs the video signal from the server 100 to the IP-KVM switch 200. The coordinate data of the mouse cursor 420 received by the downstream I/F processing unit 501 is a relative coordinate outputted from the IP-KVM switch 200 and a value adapted to a resolution which the operation screen of the server 100 has.

The data processing unit 503 converts the relative coordinate received from the downstream I/F processing unit 501 into a coordinate of the operation screen of the server 100 by using a characteristic that the coordinate of the mouse cursor 420 received by the downstream I/F processing unit 501 is the value adapted to the resolution which the operation screen of the server 100 has. Then, as with the software 407 of the first embodiment, the data processing unit 503 determines whether to notify the server 100 via the upstream I/F processing unit 502 of the relative coordinate received from the downstream I/F processing unit 501. Also, the value to be notified to the server 100 may be the relative coordinate received from the downstream I/F processing unit 501, or may be a value in which the relative coordinate is converted into the operation screen of the server 100.

The upstream I/F processing unit 502 is connected to the server 100 via the communication cable 30, receives the video signal from the server 100, and outputs the coordinate data of the mouse cursor 420 and the button data to the server 100. The upstream I/F processing unit 502 executes a relay process between the server 100 and the downstream I/F processing unit 501, and emulates each function of the downstream I/F processing unit 501. The emulation means that a keyboard, a mouse and a display which are connected to the downstream I/F processing unit 501 operate as a keyboard, a mouse and a display which are connected to the upstream I/F processing unit 502, respectively. Here, since the downstream I/F processing unit 501 is not provided with the keyboard and the mouse, the upstream I/F processing unit 502 depends on the key code, the coordinate data of the mouse cursor and the button data which are received from the downstream I/F processing unit 501. The upstream I/F processing unit 502 emulates the display connected to the downstream I/F processing unit 501 or a corresponding EDID (Extended Display Identification Data).

The communication unit 504 communicates with the client 400 via the network 300. The input I/F 505 connects a storage medium (e.g. a USB memory) that stores the coordinate information ("a"-"d") indicating the boundary between the display exclusive region 413 and the operable region 414, and size information of the operation screen of the server 100 (i.e., the resolution which the operation screen of the server 100 has). The storage unit 506 stores acquired coordinate information ("a"-"d"), acquired size information of the operation screen of the server 100, and firmware controlling the relay device 500. The coordinate information ("a"-"d") and the size information of the operation screen of the server 100 are provided in a text data format, for example.

Figure 14:
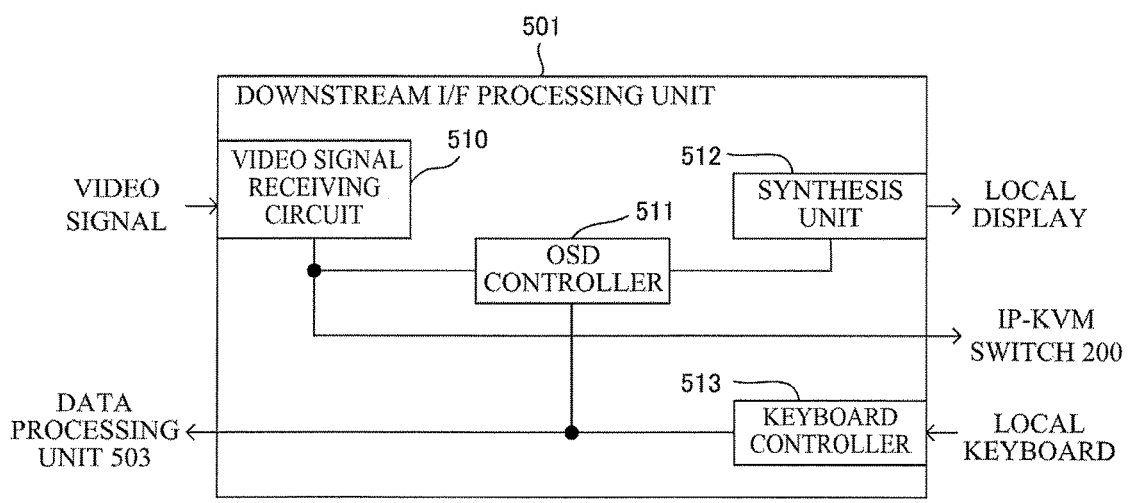
FIG. 14 is a block diagram illustrating a schematic configuration of a downstream I/F processing unit.

FIG. 14 is a block diagram illustrating a schematic configuration of the downstream I/F processing unit 501.

The downstream I/F processing unit 501 includes a video signal receiving circuit 510, an OSD controller 511, a synthesis unit 512 and a keyboard controller 513. The video signal receiving circuit 510 receives the video signal from the upstream I/F processing unit 502, and outputs it to the OSD controller 511 or the IP-KVM switch 200. The OSD controller 511 outputs data of an OSD screen described later and the video signal received from the video signal receiving circuit 510 to the synthesis unit 512. The synthesis unit 512 synthesizes the data of the OSD screen and the video signal received from the video signal receiving circuit 510, and outputs the synthesized data to a local display (not shown). The keyboard controller 513 inputs data to the OSD screen by the operation of a local keyboard, not shown. The data inputted to the OSD screen is transmitted to the data processing unit 503. The OSD controller 511 is an example of an output unit.

FIG. 15 is a diagram illustrating an example of the OSD screen.

When a hot key is inputted (e.g. a "ctrl" key and a "F1" key are simultaneously inputted) from the local keyboard, not shown, the OSD screen of FIG. 15 is displayed on the local display. In this state, when a number key is depressed, data of the number key can be inputted to an item corresponding to the number key. For example, when a number key "1" is depressed, a value of the coordinate information "a" indicating the boundary between the display exclusive region 413 and the operable region 414 can be inputted. Here, the "size X" and the "size Y" of FIG. 15 indicate sizes in a horizontal direction and a vertical direction of the operation screen of the server 100 (i.e., resolutions in the horizontal direction and the vertical direction which the operation screen of the server 100 has), respectively. When a key "R" is depressed in a state of FIG. 15, a value of each item returns to a corresponding setting value at the time of the booting of the relay device 500. When a key "S" is depressed in a state of FIG. 15, the value of each item is overwritten onto the corresponding setting value at the time of the booting of the relay device 500 and is stored.

Figure 16:
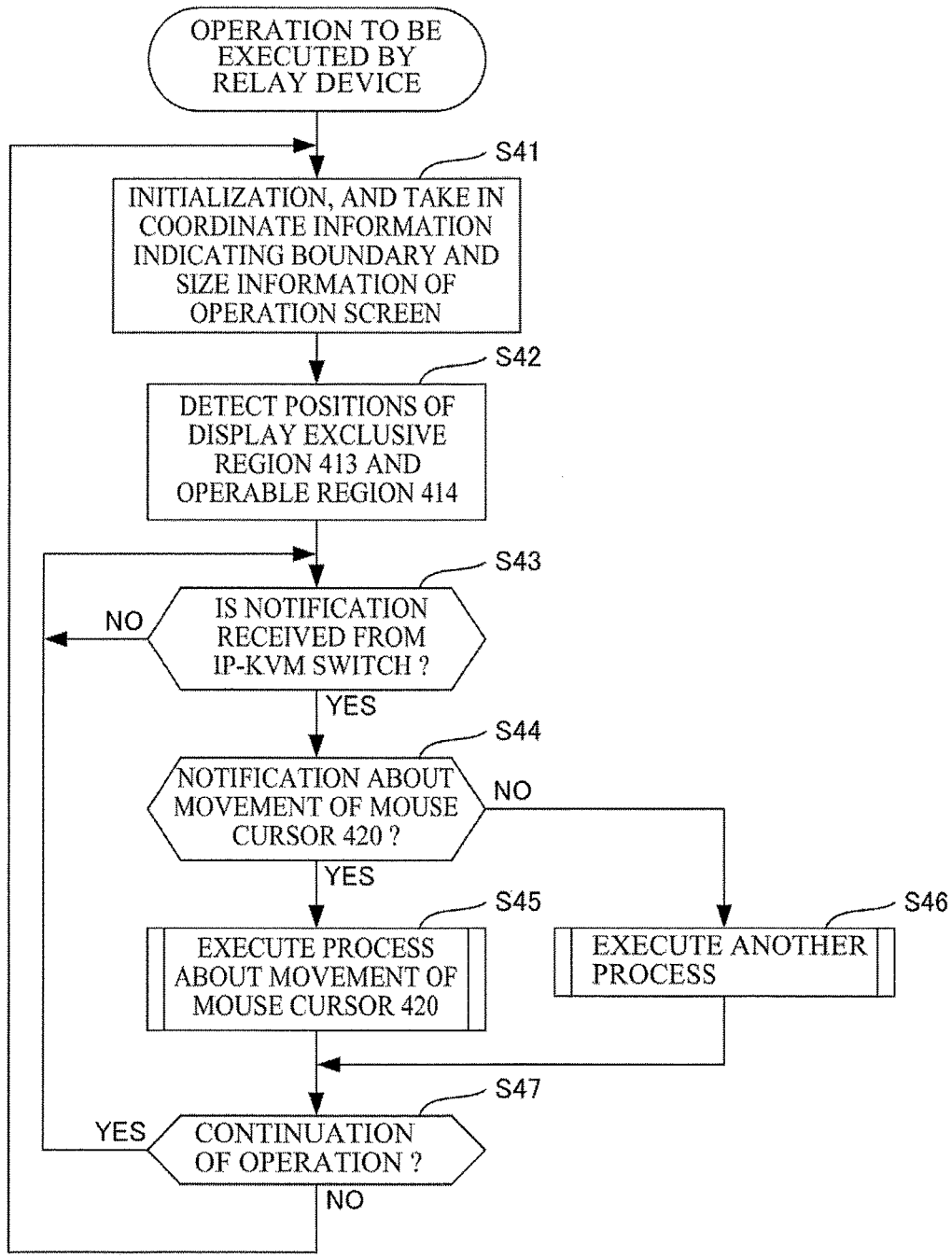
FIG. 16 is a flowchart illustrating operation to be executed by the relay device.

FIG. 16 is a flowchart illustrating operation to be executed by the relay device 500.

First, when the relay device 500 starts the operation, the data processing unit 503 executes a necessary initialization process, and takes in the coordinate information ("a"-"d") indicating the boundary between the display exclusive region 413 and the operable region 414, and the size information of the operation screen of the server 100 (step S41). A method for taking in the coordinate information indicating the boundary and the size information of the operation screen of the server 100 is any one of (1) taking in these information from a storage medium which is connected to the input I/F 505 and into which these information are stored, (2) taking in these information from the client 400 by the communication unit 504 communicating with client 400, or (3) taking in these information inputted to the OSD screen by the operator. The taken-in coordinate information indicating the boundary and the taken-in size information of the operation screen of the server 100 are stored into the storage unit 506.

Moreover, the data processing unit 503 detects the positions of the display exclusive region 413 and the operable region 414 from the coordinate information indicating the boundary between the display exclusive region 413 and the operable region 414 acquired by step S1, and the size information of the operation screen of the server 100 (step S42). The data processing unit 503 determines whether the notification is received from the IP-KVM switch 200 (step S43). When the notification is not received from the IP-KVM switch 200 (NO in step S43), the determination is repeated. On the other hand, when the notification is received from the IP-KVM switch 200 (YES in step S43), the data processing unit 503 determines whether the notification is a notification about the movement of the mouse cursor 420 (step S44).

When the notification received from the IP-KVM switch 200 is the notification about the movement of the mouse cursor 420 (YES in step S44), the data processing unit 503 execute a process about the movement of the mouse cursor 420 as described later (step S45). When the notification received from the IP-KVM switch 200 is not the notification about the movement of the mouse cursor 420 (NO in step S44), the data processing unit 503 executes another process described later (step S46). After step S45 or step S46, the data processing unit 503 determines whether to continue the operation (step S47). When the operation is continued (YES in step S47), the procedure returns to step S43. When the operation is not continued (NO in step S47), the procedure returns to step S41.

In the remote operation software 406, it is a necessary condition to always make the positions of the mouse cursor 421 of the server 100 and the mouse cursor 420 of the client 400 coincide with each other. At the time of the operation start of the window 411 of the remote operation software 406, there is a possibility that the positions of the two mouse cursors does not coincide with each other. At the time of the operation start of the window 411 of the remote operation software 406, the client 400 outputs a given coordinate in order to make the positions of the two mouse cursors coincide with each other.

Figure 17:
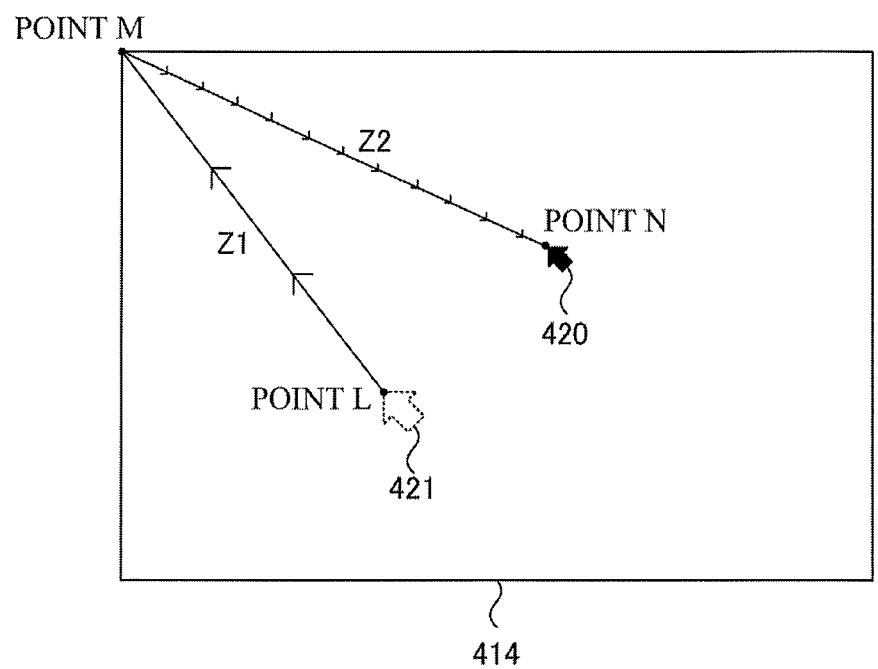
FIG. 17 is a diagram for explaining a process which makes the positions of two mouse cursors coincide with each other.

FIG. 17 is a diagram for explaining a process which makes the positions of the mouse cursors 420 and 421 coincide with each other.

First, in order to moves the mouse cursor 421 located on a point L to a point M (i.e., a left upper end of the operable region 414), the remote operation software 406 notifies the server 100 via the IP-KVM switch 200 of relative coordinates Z1 to be added to the coordinate of the mouse cursor 421 as a movement amount of the mouse cursor 421. In order to move the mouse cursor 421 to the point M, when the notified relative coordinate values are accumulated, the notified relative coordinate values are configured to become a movement amount exceeding the size of the operable region 414. Next, in order to moves the mouse cursor 421 from the point M to a point N at which the mouse cursor 420 is located, the remote operation software 406 calculates a difference between the coordinates of the points M and N, and notifies the server 100 via the IP-KVM switch 200 of relative coordinates Z2 to be added to the coordinate of the mouse cursor 421 as a movement amount corresponding to the calculated difference. Thereby, the mouse cursors 421 and 420 can be overlapped with each other.

The movement amount for moving the mouse cursor 421 from the point L to the point M is set extremely larger than the movement amount for moving the mouse cursor 421 from the point M to the point N. A movement amount or a number of transmission times of the movement amount which can certainly move the mouse cursor 421 from the point L to the point M is notified to the server 100. Moreover, in order to certainly move the mouse cursor 421 from the point M to the point N without being affected by the acceleration/speed process of the server 100, the characteristic of the IP-KVM switch 200 or the like, when the mouse cursor is moved from the point M to the point N, a movement amount or a number of transmission times of the movement amount which is not accelerated by the server 100 is notified to the server 100.

The data processing unit 503 of the relay device 500 monitors the output of the relative coordinate of the remote operation software 406 for alignment of the mouse cursors 420 and 421, and identifies the coordinates of the mouse cursors 420 and 421. Specifically, the data processing unit 503 calculates the coordinate of the point M from the coordinate information indicating the boundary between the display exclusive region 413 and the operable region 414, and the size information of the operation screen of the server 100. Then, the data processing unit 503 can identify a coordinate of a coincidence position (i.e., the point N) of the mouse cursors 420 and 421 by adding the relative coordinate Z2 to the coordinate of the point M.

Here, it is assumed that the point M is a reference point for identifying the positions of the mouse cursors 420 and 421. Although the point M is the left upper end of the operable region 414, the point M which is the reference point is not limited to the left upper end of the operable region 414 in the present embodiment. For example, the reference point may be any one of the left lower end, the right lower end, the right upper end or a center of the operable region 414.

Figure 18:
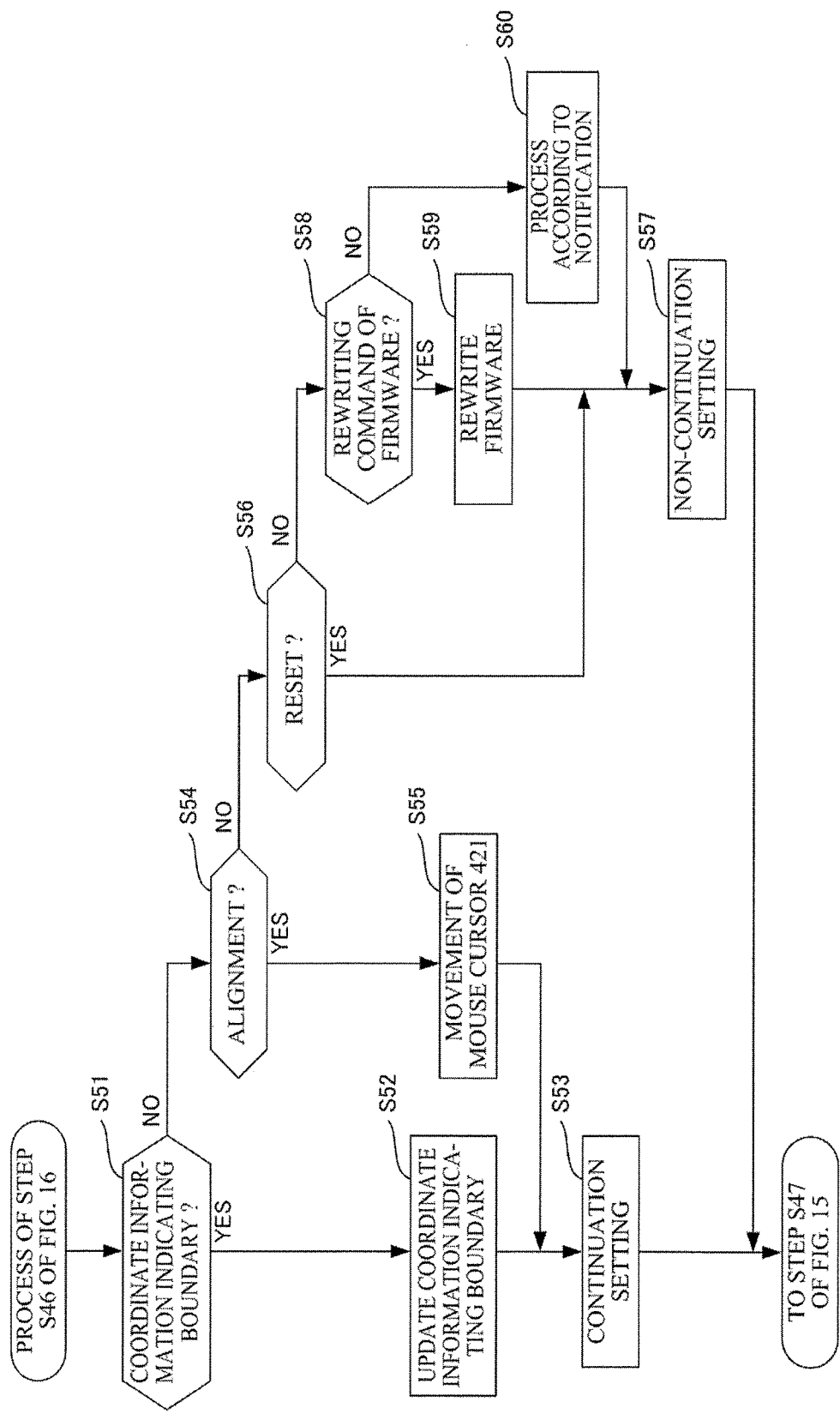
FIG. 18 is a flowchart illustrating another process of step S46 of FIG. 16.

FIG. 18 is a flowchart illustrating another process of step S46 of FIG. 16.

First, the data processing unit 503 determines whether the received notification is the coordinate information ("a"-"d") indicating the boundary between the display exclusive region 413 and the operable region 414 (step S51). When the received notification is the coordinate information indicating the boundary between the display exclusive region 413 and the operable region 414 (YES in step S51), the data processing unit 503 updates the coordinate information indicating the boundary stored into the storage unit 506 (step S52), and sets the continuation of the movement of the relay device 500 (step S53). The procedure advances to step S47 of FIG. 15.

When the received notification is not the coordinate information indicating the boundary between the display exclusive region 413 and the operable region 414 (NO in step S51), the data processing unit 503 determines whether the received notification is a command for alignment of the mouse cursors 420 and 421 (step S54). When the notification received from the IP-KVM switch 200 is the command for alignment of the mouse cursors 420 and 421 (YES in step S54), the data processing unit 503 outputs the relative coordinate for alignment of the mouse cursors 420 and 421 to the server 100, and moves the mouse cursor 421 to the position of the mouse cursor 420 (step S55). The procedure advances to step S53.

When the notification received from the IP-KVM switch 200 is not the command for alignment of the mouse cursors 420 and 421 (NO in step S54), the data processing unit 503 determines whether the received notification is a reset command (step S56). When the received notification is the reset command (YES in step S56), the data processing unit 503 sets the non-continuation of the movement of the relay device 500 (step S57). The procedure advances to step S47 of FIG. 15. When the received notification is not the reset command (NO in step S56), the data processing unit 503 determines whether the received notification is a rewriting command of the firmware (step S58).

When the received notification is the rewriting command of the firmware (YES in step S58), the data processing unit 503 rewrites the firmware stored into the storage unit 506 (step S59). The procedure advances to step S57. When the received notification is not the rewriting command of the firmware (NO in step S58), the data processing unit 503 executes a process according to the received notification (step S60). The procedure advances to step S57.

Figure 19:
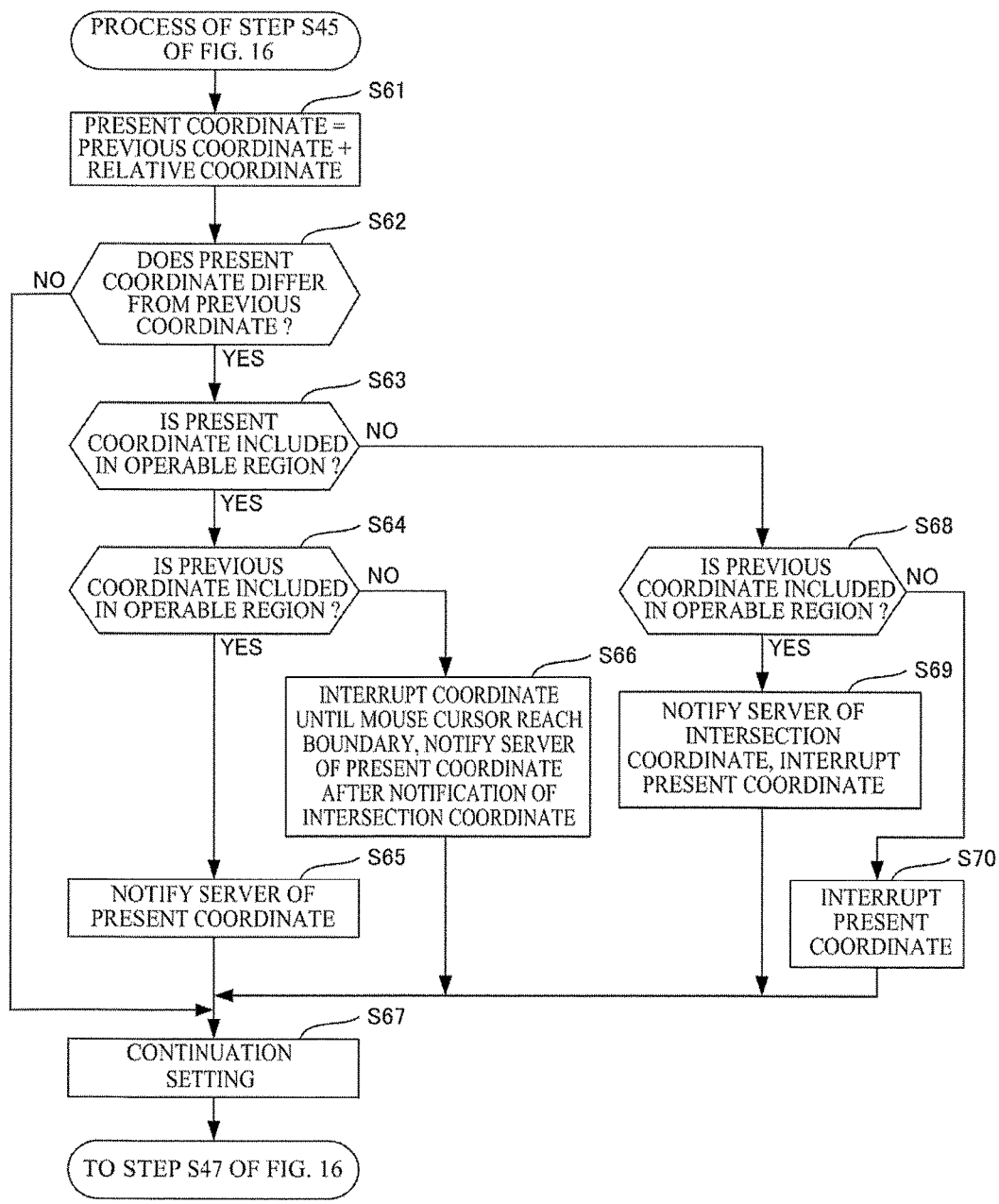
FIG. 19 is a flowchart illustrating a process about the movement of the mouse cursor in step S45 of FIG. 16.

FIG. 19 is a flowchart illustrating a process about the movement of the mouse cursor 420 in step S45 of FIG. 16. Here, it is assumed that the alignment of the mouse cursors 420 and 421 (step S55 of FIG. 18) has already completed. Therefore, the position of the mouse cursor 420 coincides with the position of the mouse cursor 421, and the movement amount of the mouse cursor 420 coincides with the movement amount of the mouse cursor 421.

First, when the relative coordinate of the mouse cursor 420 (i.e., the movement amount of the mouse cursor 420) is received from the IP-KVM switch 200, the data processing unit 503 adds the received relative coordinate of the mouse cursor 420 to a previous coordinate of the mouse cursor 420, and sets the addition result as a present coordinate of the mouse cursor 420 (step S61).

The data processing unit 503 determines whether the present coordinate of the mouse cursor 420 differs from the previous coordinate of the mouse cursor 420 (step S62). When the present coordinate of the mouse cursor 420 is the same as the previous coordinate of the mouse cursor 420 (NO in step S62), the data processing unit 503 continues the operation. The procedure advances to step S47 of FIG. 16. When the present coordinate of the mouse cursor 420 differs from the previous coordinate of the mouse cursor 420 (YES in step S62), the data processing unit 503 determines whether the present coordinate of the mouse cursor 420 is included in the operable region 414 (step S63).

When the present coordinate of the mouse cursor 420 is included in the operable region 414 (YES in step S63), the data processing unit 503 determines whether the previous coordinate of the mouse cursor 420 is included in the operable region 414 (step S64). When the previous coordinate of the mouse cursor 420 is included in the operable region 414 (YES in step S64), the mouse cursor 420 moves in the operable region 414, and hence the data processing unit 503 directly notifies the server 100 of the present coordinate of the mouse cursor 420 (step S65). The procedure advances to step S67.

When the previous coordinate of the mouse cursor 420 is not included in the operable region 414 (NO in step S64), the data processing unit 503 calculates an intersection of the boundary between the display exclusive region 413 and the operable region 414, and a straight line connecting the present coordinate of the mouse cursor 420 and the previous coordinate of the mouse cursor 420, notifies the server 100 of a coordinate of the intersection, and then notifies the server 100 of the present coordinate of the mouse cursor 420 (step S66). The procedure advances to step S67. In this case, since the mouse cursor 420 moves from the display exclusive region 413 to the operable region 414, the coordinate of the intersection is notified to the server 100, so that the mouse cursor 421 overlaps with the mouse cursor 420 when the mouse cursor 420 enters the operable region 414. Then, the present coordinate of the mouse cursor 420 is notified to the server 100, so that the mouse cursor 421 moves so as to follow the movement of the mouse cursor 420. Moreover, until the mouse cursor 420 reaches the boundary between the display exclusive region 413 and the operable region 414 from the outside of the operable region 414, the data processing unit 503 does not notify the server 100 of the coordinate of the mouse cursor 420 and interrupts the coordinate of the mouse cursor 420 (step S66).

When the present coordinate of the mouse cursor 420 is not included in the operable region 414 (NO in step S63), the data processing unit 503 determines whether the previous coordinate of the mouse cursor 420 is included in the operable region 414 (step S68). When the previous coordinate of the mouse cursor 420 is included in the operable region 414 (YES in step S68), the data processing unit 503 calculates an intersection of the boundary between the display exclusive region 413 and the operable region 414, and the straight line connecting the present coordinate of the mouse cursor 420 and the previous coordinate of the mouse cursor 420, notifies the server 100 of the coordinate of the intersection, does not notify the server 100 of the present coordinate of the mouse cursor 420 and interrupts the coordinate of the mouse cursor 420 (step S69). Then, the procedure advances to step S67. In this case, since the mouse cursor 420 moves from the operable region 414 to the display exclusive region 413 (outside the operable region 414), the coordinate of the intersection is notified to the server 100, so that the mouse cursor 421 follows the movement of the mouse cursor 420 until reaching the boundary and stops when reaching the boundary.

When the previous coordinate of the mouse cursor 420 is not included in the operable region 414 (NO in step S68), since the mouse cursor 420 moves in the display exclusive region 413 (outside the operable region 414), the data processing unit 503 does not notify the server 100 of the present coordinate of the mouse cursor 420, and interrupts the present coordinate of the mouse cursor 420 (step S70). Then, the procedure advances to step S67.

According to the third embodiment, the deviation between the mouse cursor 421 operating on the server 100 and the mouse cursor 420 operating on the client 400 can be suppressed without adding the software 407 to the client 400, i.e., imposing a new burden on the client 400.

A recording medium on which a software program for realizing the function of the relay device 500 is recorded may be supplied to the relay device 500, and a microcomputer included in the relay device 500 may read and execute the program recorded on the recording medium. In this manner, the same effects as those of the third embodiment can be achieved. The recording medium for providing the program may be a CD-ROM, a DVD, or a SD card, for example. Alternatively, the software program for realizing the function of the relay device 500 is recorded may be supplied to the relay device 500, and the microcomputer included in the relay device 500 may execute the program. Also in this manner, the same effects as those of the third embodiment can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer readable medium causing a computer to execute a process, the computer being connected to a server via an IP-KVM (K: keyboard, V: video, M: mouse) switch, displaying on a display unit an operation screen of the server, a first mouse cursor operating on the server and a second mouse cursor operating on the computer, and remotely operating the server, the process comprising:

acquiring coordinate information indicating a boundary between an operable region and an inoperable region in the operation screen of the server, the inoperable region being a region on the operation screen of the server into which the first mouse cursor cannot move, and the operable region being a region on the operation screen of the server into which the first mouse cursor can move;

controlling a movement of the second mouse cursor on the display unit upon an operation of the mouse;

acquiring an arrangement coordinate, on the display unit of a first window for displaying the operation screen of the server onto which the first mouse cursor is displayed;

determining positions of the operable region and the inoperable region on the display unit from the acquired coordinate information indicating the boundary and the acquired arrangement coordinate;

controlling a movement of the first mouse cursor upon an operation of the mouse by notifying the first window of information corresponding to a coordinate of the second mouse cursor on the display unit of the computer; and interrupting notifying the first window of the information corresponding to the coordinate of the second mouse cursor on the display unit when a position of the displayed second mouse cursor is in the determined inoperable region on the display unit while allowing the second mouse cursor to move in the determined inoperable region.

2. The non-transitory computer readable medium as claimed in claim 1, wherein a second window having the same size as the first window is arranged on the first window, the interrupting is executed by the second window, the second window acquires the coordinate of the second mouse cursor on the display unit, when the acquired coordinate of the second mouse cursor on the display unit is in the inoperable region, the second window interrupts notifying the first window of the acquired coordinate of the second mouse cursor on the display unit, and when the acquired coordinate of the second mouse cursor on the display unit is in the operable region, the second window notifies the first window of the acquired coordinate of the second mouse cursor on the display unit.

3. The non-transitory computer readable medium as claimed in claim 2, comprising:

executing, when any one of commands for the movement, the magnification, the reduction and the completion of the first window is acquired, any one of the movement, the magnification, the reduction and the completion of the second window according to the acquired command.

4. The non-transitory computer readable medium as claimed in claim 1, wherein when a previous coordinate of the second mouse cursor acquired operating system is included in the inoperable region and a present coordinate of the second mouse cursor acquired is included in the operable region, the interrupting interrupts notifying the first window of the coordinate of the second mouse cursor on the display unit until the second mouse cursor reaches the boundary between the operable region and the inoperable region, and when the second mouse cursor reaches the boundary between the operable region and the inoperable region, the interrupting calculates an intersection of the boundary between the operable region and the inoperable region, and a straight line connecting the previous coordinate of the second mouse cursor and the present coordinate of the second mouse cursor, notifies the first window of a coordinate of the intersection, and notifies the first window of the present coordinate of the second mouse cursor.

5. The non-transitory computer readable medium as claimed in claim 1, wherein when a previous coordinate of the second mouse cursor acquired is included in the operable region and a present coordinate of the second mouse cursor acquired is included in the inoperable region, the interrupting calculates an intersection of the boundary between the operable region and the inoperable region, and a straight line connecting the previous coordinate of the second mouse cursor and the present coordinate of the second mouse cursor, notifies the first window of a coordinate of the intersection, and interrupts notifying the first window of the present coordinate of the second mouse cursor.

6. The non-transitory computer readable medium as claimed in claim 1, wherein the interrupting includes snatching the coordinate of the second mouse cursor to be outputted to the first window, when the snatched coordinate of the second mouse cursor is included in the inoperable region, the interrupting interrupts notifying the first window of the snatched coordinate of the second mouse cursor, and when the snatched coordinate of the second mouse cursor is included in the operable region, the interrupting notifies the first window of the snatched coordinate of the second mouse cursor.

7. The non-transitory computer readable medium as claimed in claim 1, comprising:

moving the first mouse cursor to a reference point of the operable region when the first mouse cursor and the second mouse cursor are aligned; and moving the first mouse cursor located on the reference point to a position of the second mouse cursor.

8. The non-transitory computer readable medium as claimed in claim 7, wherein when the first mouse cursor is moved to the reference point, the interrupting calculates a difference between the coordinate of the first mouse cursor and the coordinate of the reference point, and notifies the server of a movement amount for making the first mouse cursor pass through the reference point, and when the first mouse cursor is moved from the reference point, the interrupting notifies the server of a movement amount for moving the first mouse cursor from the reference point to the position of the second mouse cursor.

9. A relay device connected between a server and an IP-KVM (K: keyboard, V: video, M: mouse) switch connected to a client, the client displaying on an operation screen of the client a first mouse cursor operating on an operation screen of the server and a second mouse cursor operating on the operation screen of the client, and remotely operating the operation screen of the server, the relay device comprising:

a memory; and a processor coupled to the memory, and the processor configured to:

acquire coordinate information indicating a boundary between an operable region and an inoperable region in the operation screen of the server, and size information of the operation screen of the server, the inoperable region being a region on the operation screen of the server into which the first mouse cursor cannot move, and the operable region being a region on the operation screen of the server into which the first mouse cursor can move;

determine positions of the operable region and the inoperable region on the operation screen of the client from the acquired coordinate information and the acquired size information;

control a movement of the second mouse cursor on the operation screen of client upon an operation of the mouse;

acquire a coordinate of the second mouse cursor displayed on the operation screen of the client control a movement of the first mouse cursor on the operation screen of the client upon an operation of the mouse by notifying the server of information corresponding to a coordinate of the second mouse cursor on the operation screen of the client; and interrupt notifying the server of information corresponding to the present coordinate of the second mouse cursor when a position, of the second mouse cursor is in the inoperable region on the operation screen of the client.

10. The relay device as claimed in claim 9, wherein when the previous coordinate of the second mouse cursor is in the inoperable region and the present coordinate of the second mouse cursor is in the operable region, the processor interrupts notifying the server of the information corresponds to the coordinate of the second mouse cursor until the second mouse cursor reaches the boundary between the operable region and the inoperable region, and when the second mouse cursor reaches the boundary between the operable region and the inoperable region, the processor calculates an intersection of the boundary between the operable region and the inoperable region, and a straight line connecting the previous coordinate of the second mouse cursor and the present coordinate of the second mouse cursor, notifies the server of a coordinate of the intersection, and notifies the server of the information corresponds to the present coordinate of the second mouse cursor.

11. The relay device as claimed in claim 9, wherein when the previous coordinate of the second mouse cursor is in the operable region and the present coordinate of the second mouse cursor is in the inoperable region, the processor calculates an intersection of the boundary between the operable region and the inoperable region, and a straight line connecting the previous coordinate of the second mouse cursor and the present coordinate of the second mouse cursor, notifies the server of a coordinate of the intersection, and interrupts notifying the server of the information corresponds to the present coordinate of the second mouse cursor.

12. The relay device as claimed in claim 9, wherein the client aligns the position of the first mouse cursor and the second mouse cursor by making the first mouse cursor pass through a predetermined reference point of the operable region, moving the first mouse cursor to the position of the second mouse cursor,
calculating a coordinate of the reference point from the acquired coordinate information and the acquired size information, and acquiring the coordinate of the second mouse cursor by adding to the coordinate of the reference point a relative coordinate of the first mouse cursor when the first mouse cursor is moved from the reference point to the position of the second mouse cursor.

13. An information processing device that is connected to a server via an IP-KVM (K: keyboard, V: video, M: mouse) switch, displays on a display unit an operation screen of the server, a first mouse cursor operating on the server and a second mouse cursor operating on the information processing device, controls a movement of the second mouse cursor upon an operation of the mouse, and remotely operates the server, the information processing device comprising:
a memory; and
a processor coupled to the memory and the processor configured to:
acquire coordinate information indicating a boundary between an operable region and an inoperable region in the operation screen of the server, the inoperable region being a region on the operation screen of the server into which the first mouse cursor cannot move, and the operable region being a region on the operation screen of the server into which the first mouse cursor can move;
control a movement of the second mouse cursor on the display unit upon an operation of the mouse;
acquire an arrangement coordinate on the display unit of a first window for displaying the operation screen of the server onto which the first mouse cursor is displayed;
determine positions of the operable region and the inoperable region on the display unit from acquired coordinate information indicating the boundary and the acquired arrangement coordinate of the first window;
control a movement of the first mouse cursor upon an operation of the mouse by notifying the first window of information corresponding to a coordinate of the second mouse cursor on the display unit of the information processing device; and
interrupt notifying the first window of the information corresponding to the coordinate of the second mouse cursor on the display unit when a position of the displayed second mouse cursor is in the determined inoperable region on the displaying unit while allowing the second mouse cursor to move in the determined inoperable region.

14. A non-transitory computer readable medium causing a computer to execute a process, the computer being connected to a server including a first mouse cursor which operates on the server, displaying an operation screen of the server onto which the first mouse cursor is displayed based on received information from the server concerning the operation screen of the server and a second mouse cursor which operates on the computer, and remotely operating the server, the process comprising:
controlling a movement of the first mouse cursor and the second mouse cursor upon an operation of the mouse; and;
determining whether a position of the second mouse cursor in the display unit is in an operative region on the displayed operation screen of the server into which the first mouse cursor can move or in an inoperative region on the displayed operation screen of the server into which the first mouse cursor cannot move; and
wherein the controlling the movement of the first mouse cursor and the second mouse cursor includes controlling the movement of the first mouse cursor and the second mouse cursor, so as to simultaneously move both of the first mouse cursor and the second mouse cursor when the determined position of the second mouse cursor is in the operative region, and so as to stop the movement of the first mouse cursor when the determined position of the second mouse cursor is in the inoperative region while controlling the second mouse cursor to move in the inoperative region.

15. An information processing device that is connected to a server, and remotely operates the server including a first mouse cursor which operates on the server, the information processing device comprising:
a display configured to display the operation screen of the server onto which the first mouse cursor is displayed based on information received from the server concerning the operation screen of the server, and a second mouse cursor operating on the information processing device;
a mouse; and
a processor configured to:
control a movement of the first mouse cursor and the second mouse cursor upon an operation of the mouse; and;
determine whether a position of the second mouse cursor in the display unit is in an operative region on the displayed operation screen of the server into which the first mouse cursor can move, or in an inoperative region on the displayed operation screen of the server into which the first mouse cursor cannot move,
wherein the controlling the movement of the first mouse cursor and the second mouse cursor includes controlling the movement of the first mouse cursor and the second mouse cursor, so as to simultaneously move both of the first mouse cursor and the second mouse cursor when the determined position of the second mouse cursor is in the operative region, and so as to stop the movement of the first mouse cursor when the determined position of the second mouse cursor is in the inoperative region while controlling the second mouse cursor to move in the inoperative region.

* * * * *

UNITED STATES PATENT AND TRADEMARK OFFICE
CERTIFICATE OF CORRECTION

PATENT NO. : 10,275,112 B2
APPLICATION NO. : 14/686363
DATED : April 30, 2019
INVENTOR(S) : Naoyuki Nagao Page 1 of 1

It is certified that error appears in the above-identified patent and that said Letters Patent is hereby corrected as shown below:

In the Claims

Column 23, Line 9:
In Claim 4, after "acquired" delete "operating system"

Column 24, Line 13:
In Claim 9, after "memory," delete "and"

Signed and Sealed this
Second Day of July, 2019

Andrei Iancu
*Director of the United States Patent and Trademark Office*